United States Patent [19]
Audebert

[11] Patent Number: 5,887,065
[45] Date of Patent: Mar. 23, 1999

[54] SYSTEM AND METHOD FOR USER AUTHENTICATION HAVING CLOCK SYNCHRONIZATION

[75] Inventor: Yves Audebert, Foster City, Calif.

[73] Assignee: Activcard, Sursesnes Cedex, France

[21] Appl. No.: 944,071

[22] Filed: Oct. 2, 1997

Related U.S. Application Data

[63] Continuation-in-part of Ser. No. 620,162, Mar. 22, 1996, Pat. No. 5,737,421.

[51] Int. Cl.$^6$ .............................. H04K 1/00; H04L 9/00; G06K 5/00
[52] U.S. Cl. .............................. 380/23; 235/382; 380/25; 380/48; 380/49
[58] Field of Search ................................ 380/23, 25, 48, 380/49; 235/382

[56] References Cited

U.S. PATENT DOCUMENTS

| | | | |
|---|---|---|---|
| 4,800,590 | 1/1989 | Vaughan . | |
| 4,885,778 | 12/1989 | Weiss ........................................ | 380/48 |
| 4,998,279 | 3/1991 | Weiss ........................................ | 380/23 |
| 5,163,097 | 11/1992 | Pegg ........................................ | 380/21 |
| 5,361,062 | 11/1994 | Weiss et al. . | |

FOREIGN PATENT DOCUMENTS

| | | |
|---|---|---|
| 0234954 A2 | 9/1987 | European Pat. Off. . |

*Primary Examiner*—Stephen C. Buczinski
*Attorney, Agent, or Firm*—Stevens, Davis, Miller & Mosher, L.L.P.

[57] ABSTRACT

The system includes a first unit adapted to communicate with a second unit. The second unit grants conditional access to a function or service in accordance with an authentication operation. Both units are capable of running software for generating passwords by means of encryption of several dynamic variables as for example a time dependent variable and/or a variable representing the number of formulated authentication requests. The encryption may be performed using a dynamic key. In order to synchronize the values of the variables generated in concert but independently in the units, only some of the least significant digits of the variables are transferred from the card-like unit to the other unit, with the transfer being performed by adding the digits to the password. This synchronization information is combined with corresponding variables in the second unit and used to calculate therein a value which has to match with the password calculated in the second unit in order to gain access to the function or service. In a "virtual token" implementation, the first unit can be a smart card, which stores the dynamic key and the variable representing the number of formulated authentication requests and executes an encryption algorithm, a smart card reader and a personal computer. Either the smart card reader or the personal computer can generate the time dependent variable. In a "software token" implementation, the functions of the first unit are performed by a computer such as a personal computer, thus eliminating the need for a smart card or a smart card reader.

50 Claims, 9 Drawing Sheets

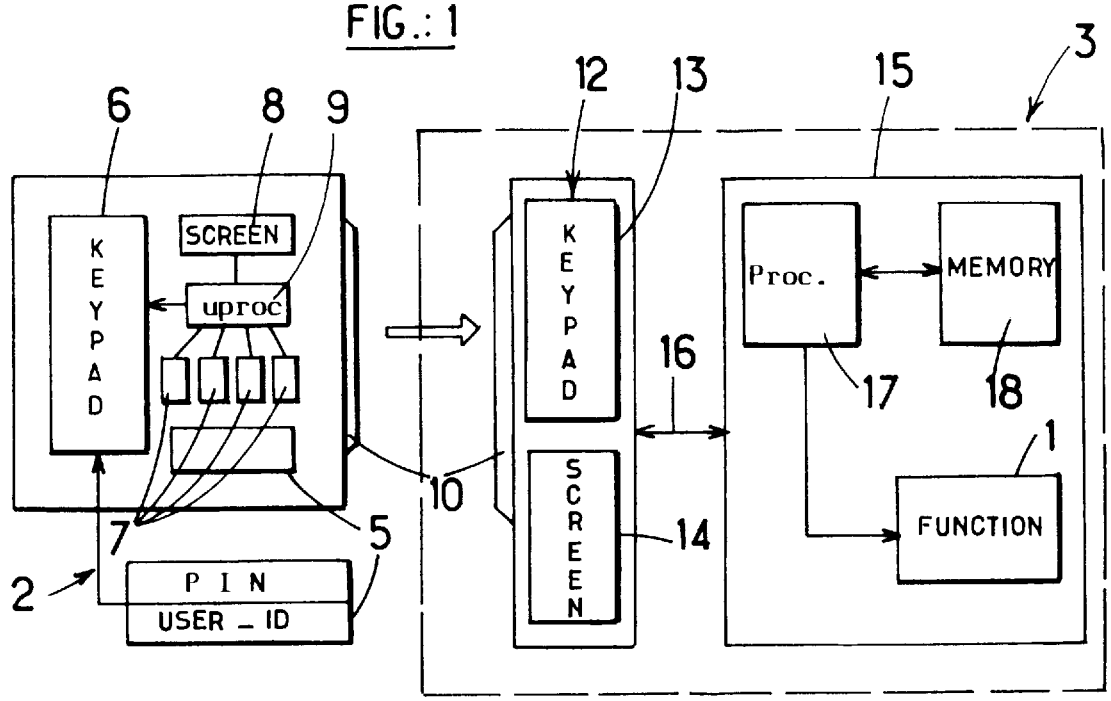
FIG.: 1
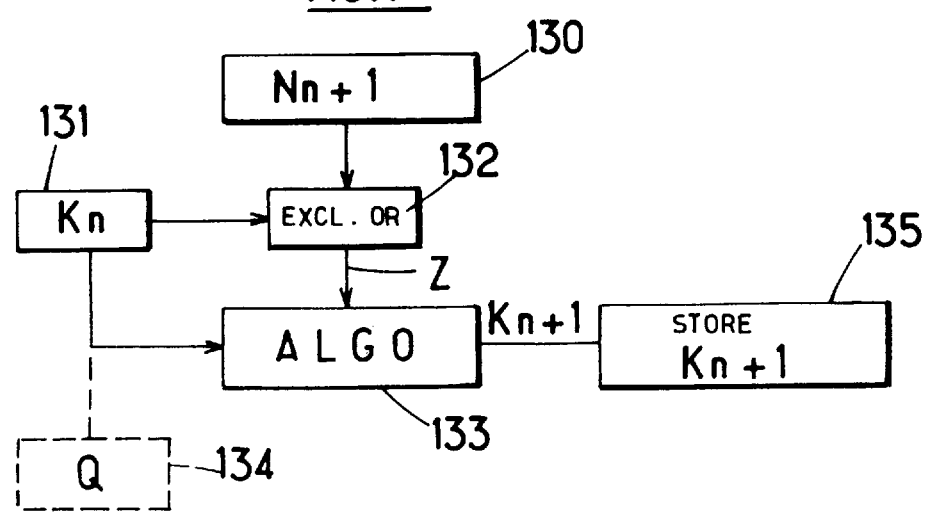
FIG.: 8

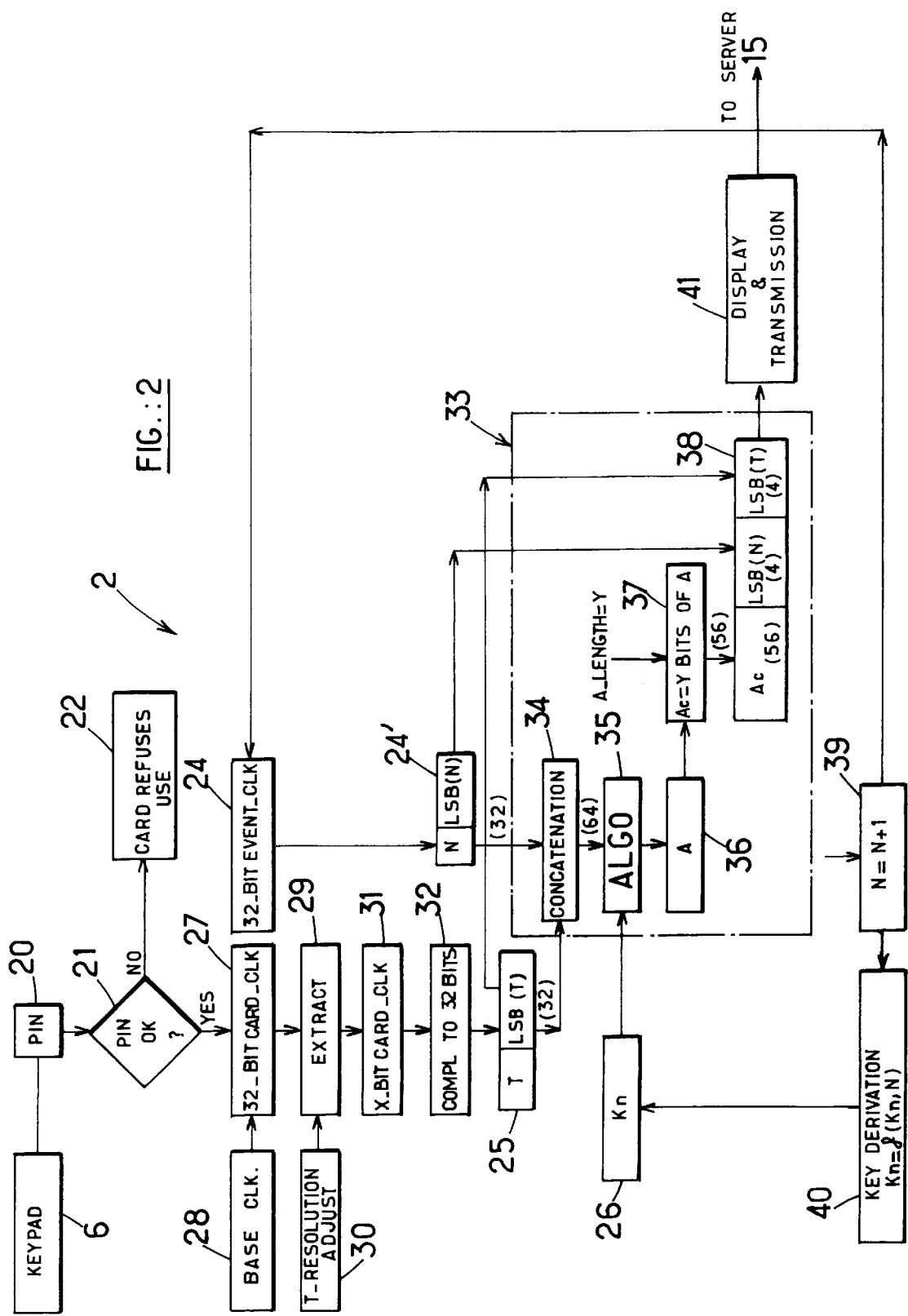

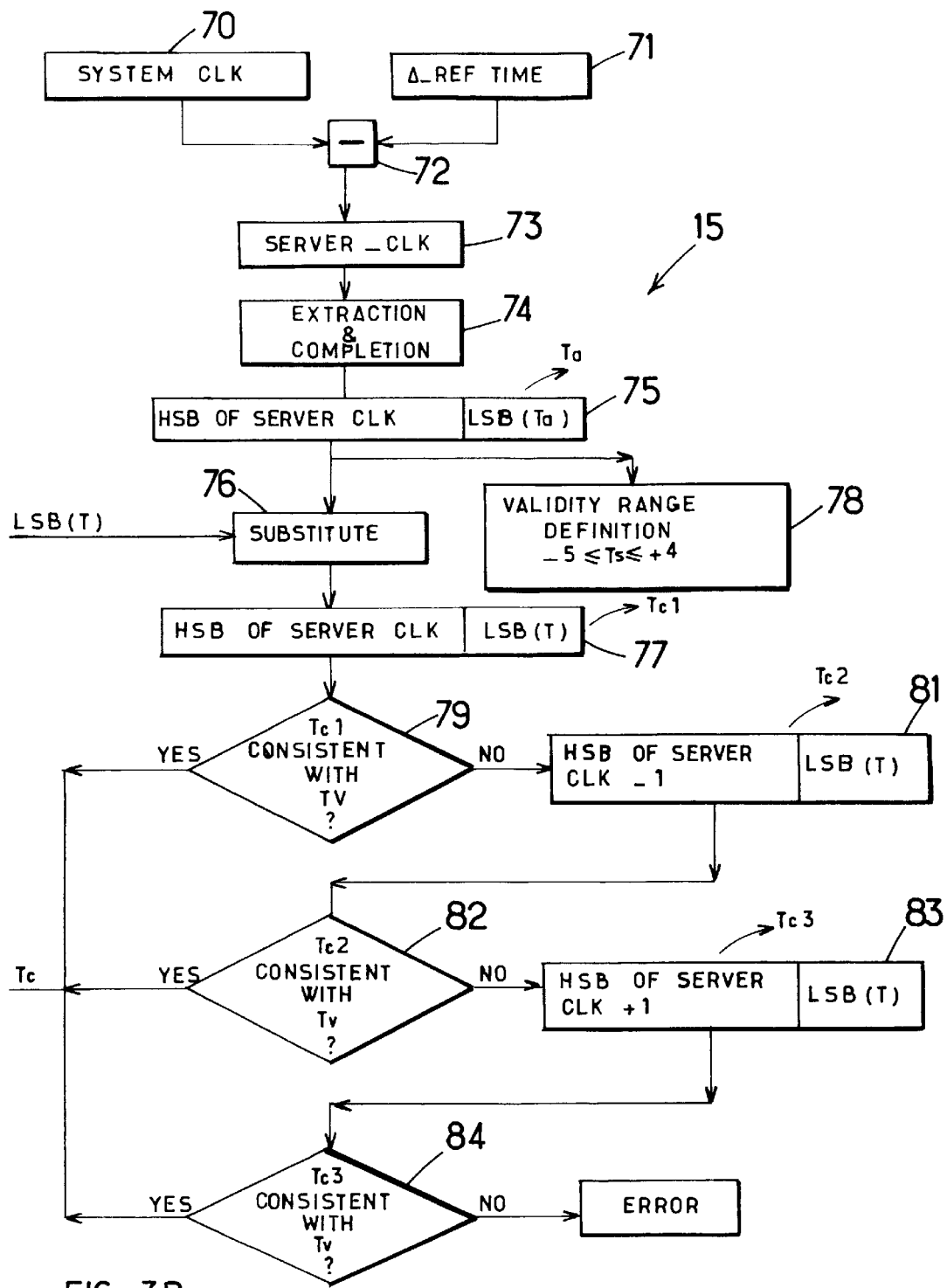
FIG.:3B
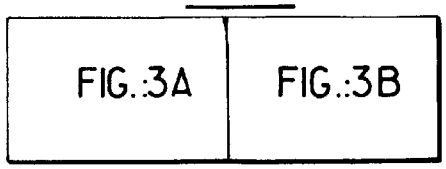

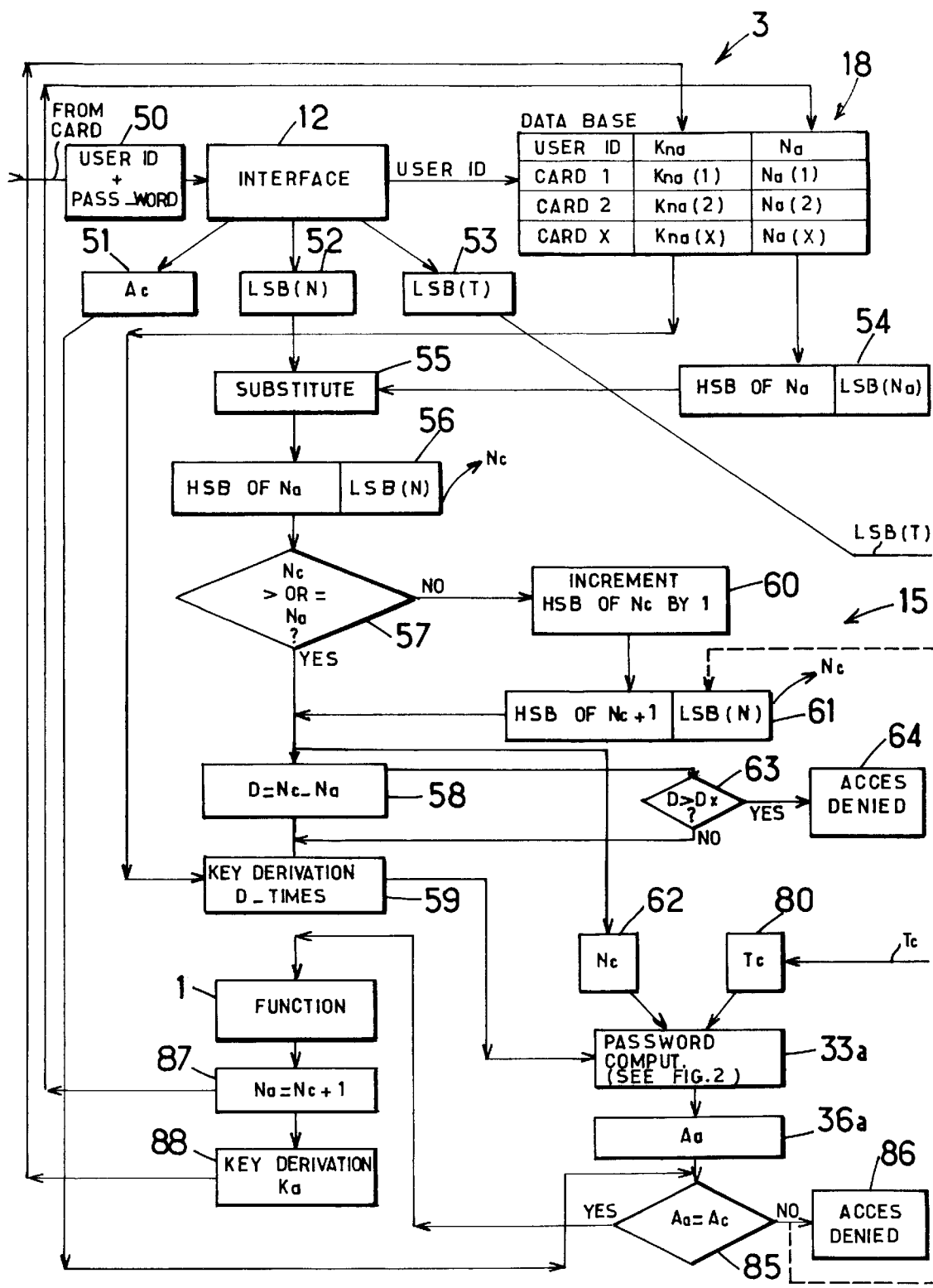
FIG.: 3A

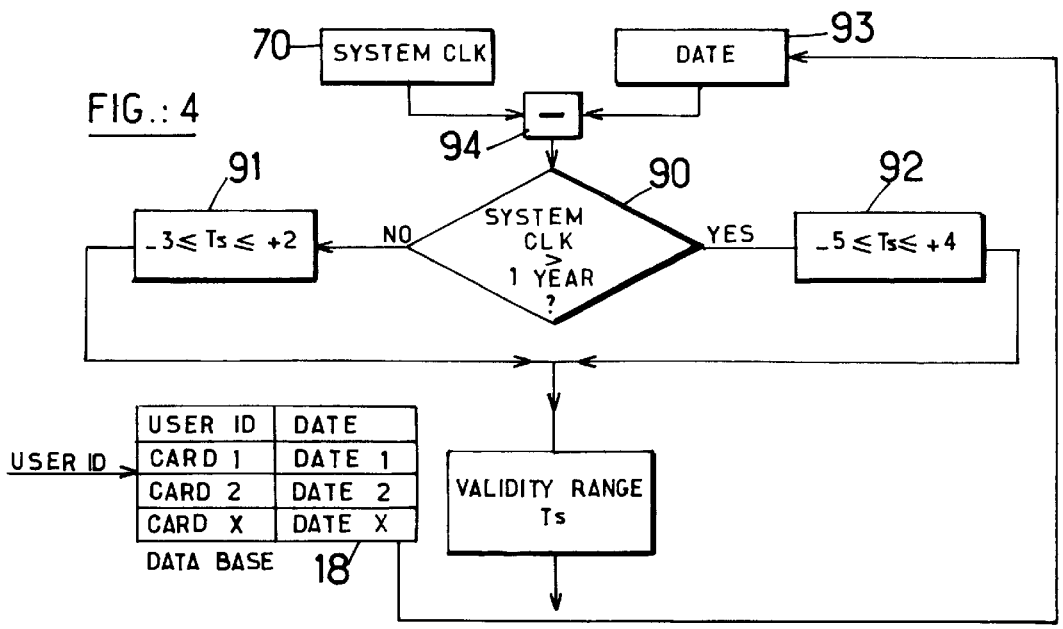
FIG.: 4
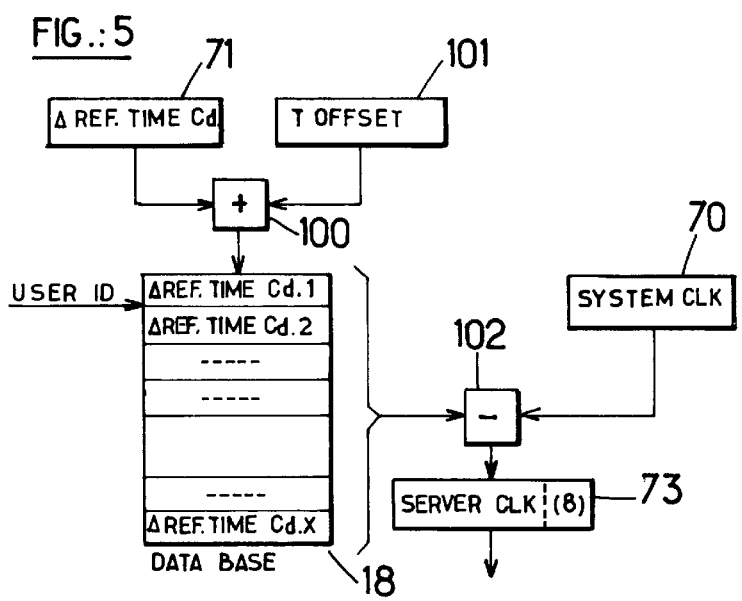
FIG.: 5
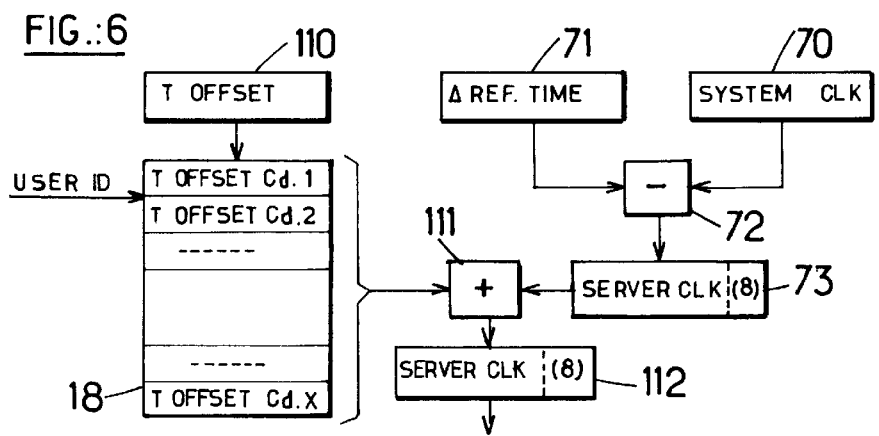
FIG.: 6

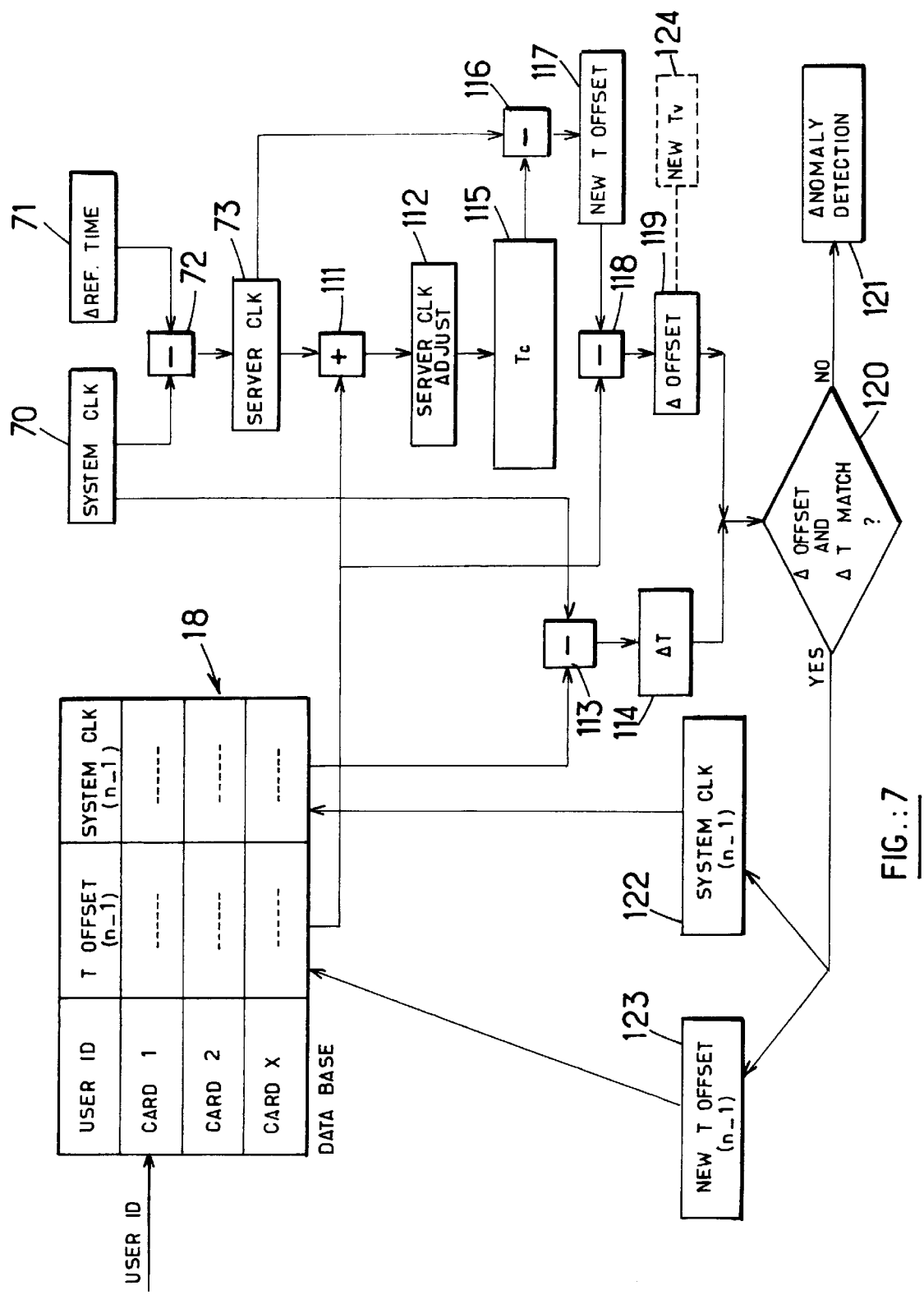
FIG.:7

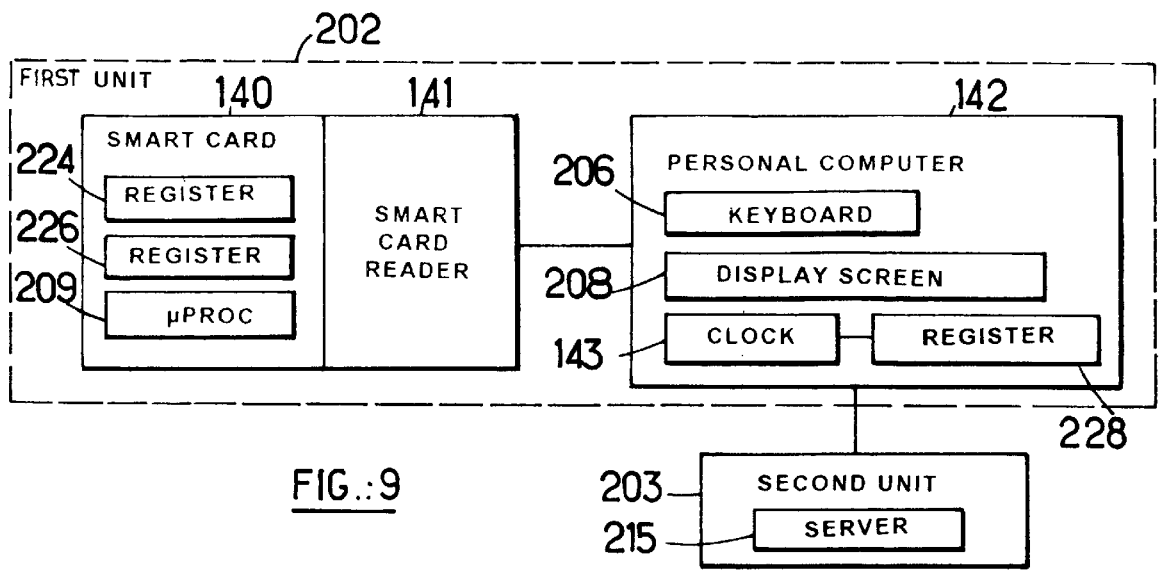
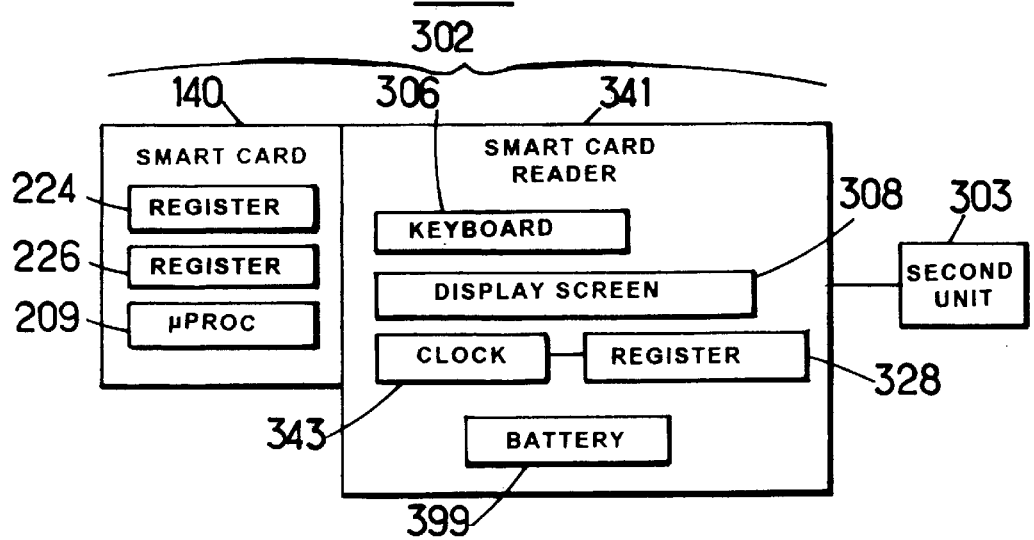

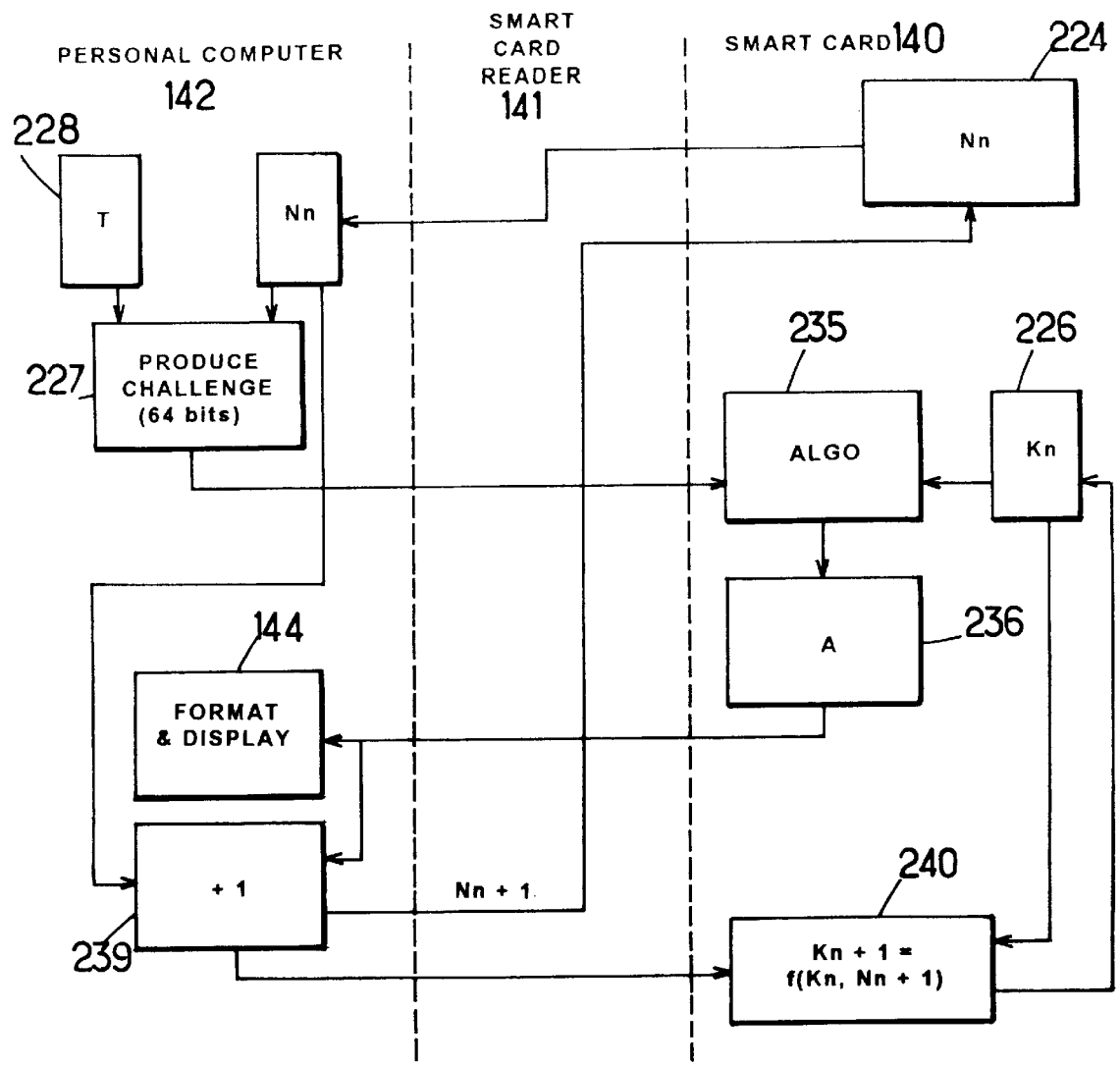
FIG.:10
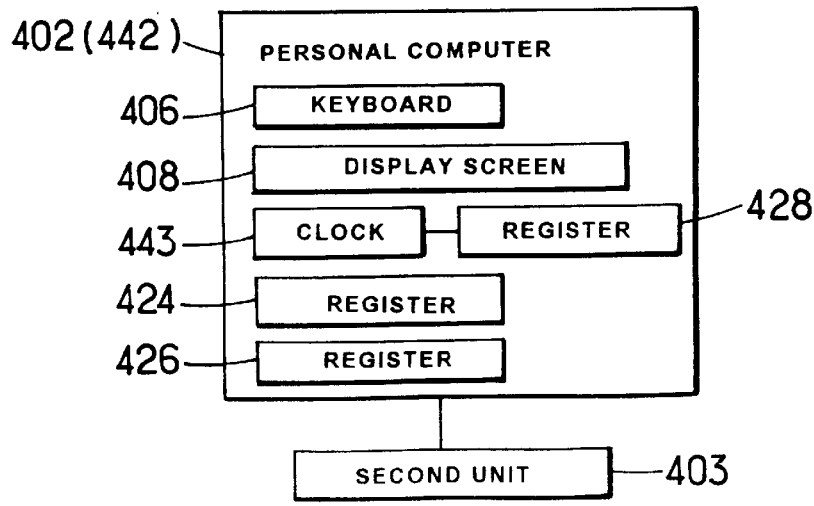
FIG.:12

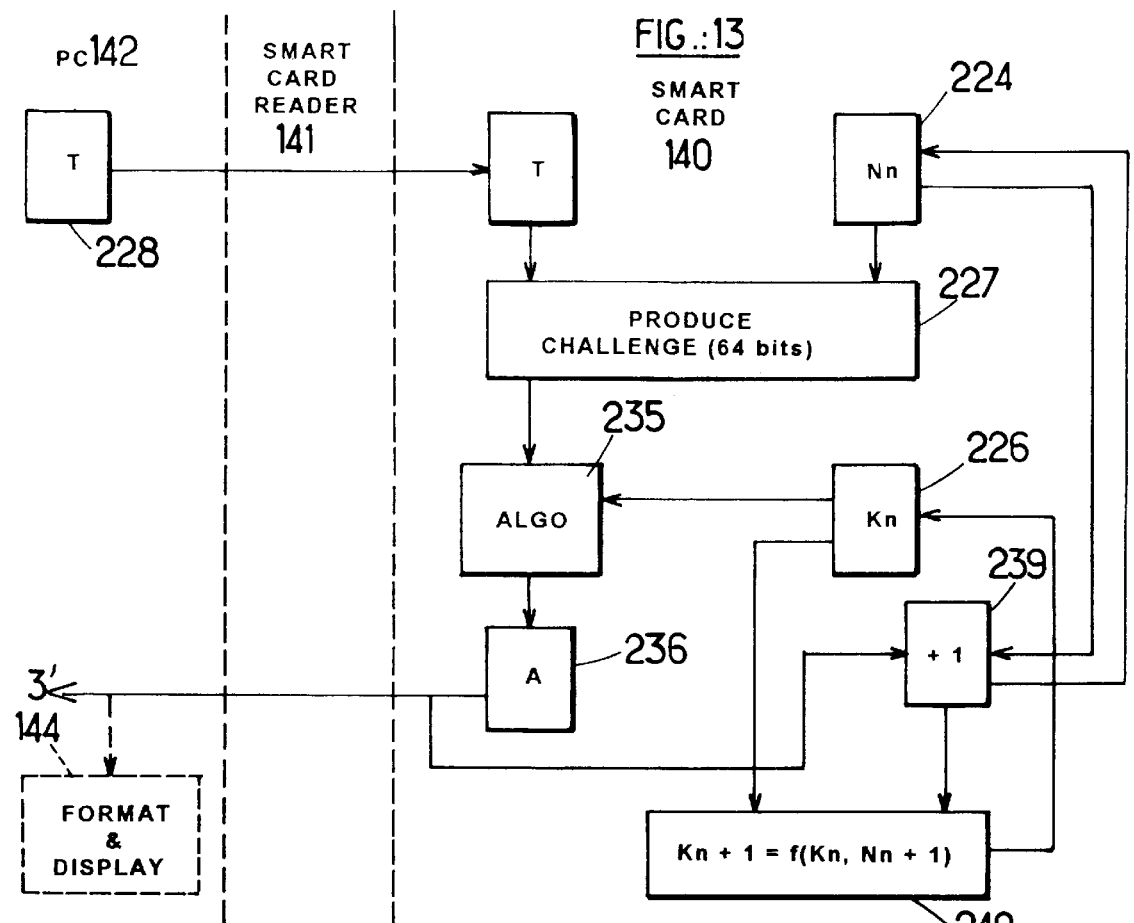
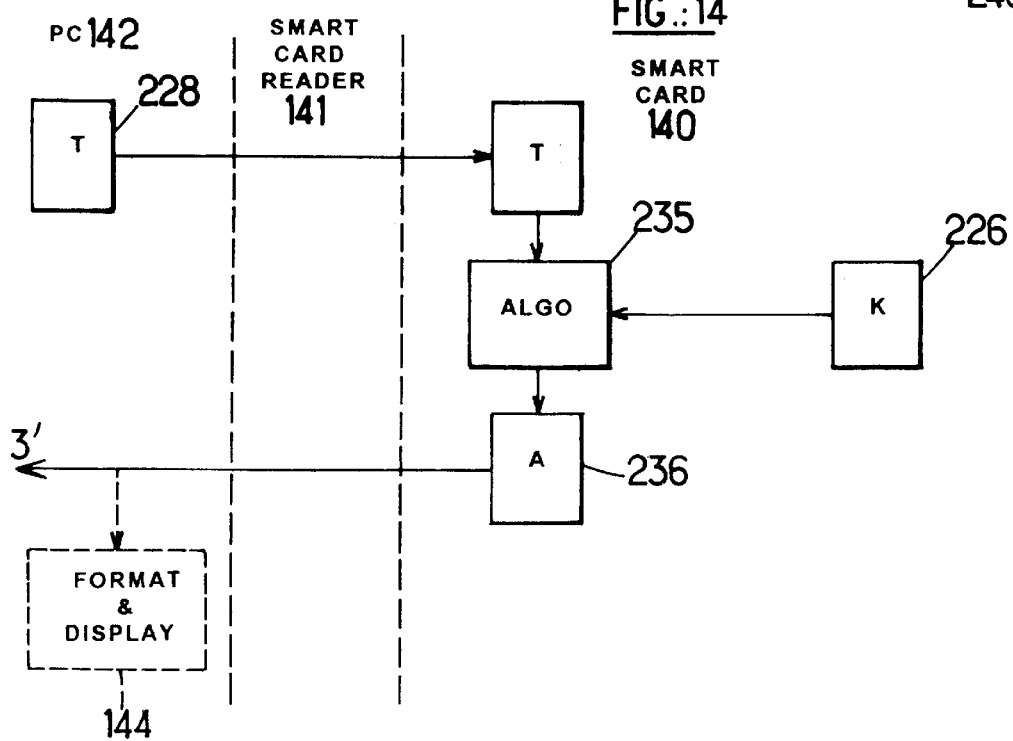

SYSTEM AND METHOD FOR USER AUTHENTICATION HAVING CLOCK SYNCHRONIZATION

CROSS REFERENCE TO RELATED APPLICATIONS

This is a continuation-in-part of U.S. application Ser. No. 08/620,162, filed Mar. 22, 1996, now U.S. Pat. No. 5,737,421, the disclosure of which is hereby incorporated by reference.

Cross-reference is hereby made to copending U.S. application Ser. No. 08/942,904, filed on the same date and by the same inventor as the present application and entitled "System and Method for User Authentication Employing Dynamic Encryption Variables" and incorporated by reference herein. That co-pending application is a continuation-in-part of U.S. application Ser. No. 08/620,240, filed Mar. 22, 1996.

BACKGROUND OF THE INVENTION

1. Field of the Invention

The present invention relates to an electronic system for authentication of individuals and/or messages, in particular for controlling access to a function, enabling a user conditionally to obtain a service or some other provision to be delivered by a specialized service unit associated with the system in question.

More particularly, the invention relates to a system for control of access to, or authentication of messages handled in, a computer or, more generally, a computerized network, use of which is reserved for persons having been duly legitimately entitled. Such networks may serve, for example, to provide all kinds of services entailing a transaction, usually with a monetary consideration, such as television shopping, pay television, home banking, interactive televised games, or also confidential faxes etc.

2. Description of the Related Art

The known systems of this kind generally include at least one electronic device or token, preferably portable (referred to as a "card" for convenience in the remainder of the present description) and at least one central electronic verification device (referred to as a "server" in the remainder of the description) which is intended conditionally to deliver authorizations for access to the function or service.

Such authorization is delivered only in the event of agreement or matching between a password produced in the card and a password produced in the server. These passwords are obtained by encrypting a variable with the aid of an encryption algorithm, which operations take place simultaneously in the card and in the server.

Usually, the encryption process employs a time parameter, often involving the use of clocks both in the cards and in the servers. In the ideal case, these clocks should be synchronized with one another; synchronization is difficult to achieve in practice, especially if, for obvious cost reasons, it is sought to install in the cards clocks which do not have very high accuracy.

A system exhibiting the general characteristics stated above is described in U.S. Pat. No. 4,800,590. In this system, each card includes a processor intended iteratively to calculate a password with the aid of an encryption algorithm. This latter periodically encrypts a parameter (referred to as the "seed") which is itself dependent on the parameter used for the previous calculation.

In such a system, the clocks of the card and of the server must in principle be synchronous so as to avoid unjustified denials of access (which are not from fraudulent or erroneous requests on the part of the user of the card).

However, whereas the clock of the server may be highly accurate, the same is not the case for the cards. Indeed, since a modest cost in respect of the cards is a paramount design constraint, it is not possible to incorporate in the cards expensive high-quality clocks which would be free of drift. A high level of synchronization between the clocks of the cards and of the server cannot therefore be envisioned in practice.

In U.S. Pat. No. 4,885,778, passwords are also periodically calculated during given successive time spans. A time dependent validity range is established in the server with a length much greater than the time span. When an access request is formulated, the server computes as many passwords as there are time spans contained in the time dependent validity range. If a password of the card matches with one of the passwords thus calculated in the server, access is granted. This system also requires a significant amount of calculating work in the server.

U.S. Pat. No. 5,361,062 discloses an authentication system which involves transferring to the server, at the moment at which an access request is input, a part of the time value available in the card on the basis of its clock. The example given in the patent is the minutes value of the clock at the moment of access. When the password is transferred, this value will be used in the server which examines whether the seconds value of its clock is less than or greater than 30 seconds. If this value is less, the server takes the chosen minutes value. In the contrary case, the minutes value in the server is increased by one unit. This process can operate correctly only if the clock of the card is either synchronous with the clock of the server with a predefined tolerance or lags behind the latter. If, on the other hand, the clock of the card leads that of the server, the latter will be unable to find the password calculated in the card during the access request in progress, since the server will not perform iterations until reaching that of the current minute of its own clock. In this case, no access request, even formulated legitimately, will be able to succeed. However, in incorporating low-quality clocks into the cards, which, as described above, is necessary for cost reasons, it is not possible to determine during manufacture in which direction the clock of a card will drift with respect to the clock of the server, particularly since the drift may be caused by wholly unpredictable phenomena such as temperature variations to which the card may be subjected.

Another drawback of the system according to U.S. Pat. No. 5,361,062 is that the elemental time unit clocking the password calculation iterations cannot be chosen to be very small, since the smaller the time unit, the greater the calculational burden both for the server and for the cards. Therefore, in practice, this time unit has been fixed at between 1 and 10 minutes. This implies that each password generated in the card remains valid throughout the duration of such a time unit. This impairs the security of the system, in particular when it includes several servers. A hacker can in fact obtain a password by intercepting it on the link between the card and the server and could then enter it into another server and obtain authorization of access, since he has the right password.

EP Patent Application No. 0 324 954 discloses an access control system which involves transmission to the server by the user of a synchronization data item which pertains to the number of access requests made previously. More precisely, if after calculating the password in the card and in the server there is non-agreement, the server displays a data item relating to the access requests which it has made in respect of this card. This data item must be entered into the card by the user in order to ensure that the same number of access requests is recorded in the card and in the server. This prior system has the drawback of involving the user in the synchronization procedure and of disclosing to any hacker the number of access requests made, although this value serves in the calculation of the password. It would therefore be preferable to keep it secret.

SUMMARY OF THE INVENTION

The object of the present invention is to provide an authorization system which is free of the drawbacks of the prior art discussed above.

In particular, an object of the invention is to provide an authentication system wherein each electronic device can transmit synchronization information to the server so that the latter is able to synchronize on the clock provided in each electronic device, provided relative drifts of the clocks in both the respective electronic devices and the server remain within predetermined limits.

Accordingly, there is provided a system for authentication of individuals and/or messages, including at least one first unit personalized for an individual and at least one second verification unit capable of delivering an authentication function authenticating the individual and/or the messages.

The first unit comprises:

first generating means for generating at least a first variable;

first calculating means for producing a first password with the aid of at least a first encryption algorithm for encrypting at least the first variable; and transmission means for transmitting the first password to the second unit;

The second unit comprises:

second generating means for, in response to an authentication request made by way of a specified one of the first units, generating at least a second variable assigned to this first unit;

second calculating means for producing a second password with the aid of at least one second encryption algorithm for encrypting at least the second variable, the first and second variables being produced in concert, but independently in the first and second units;

means for comparing the first and second passwords; and delivering means for, in the event of a predetermined consistency of the passwords, delivering the authentication function.

The transmission means is configured so as to transmit with the first password n digits having the least significant weight of the first variable from the first unit to the second unit.

The second unit further comprises:

(a) substituting means for, based on the current value of the second variable, generate a substituted variable wherein n digits having the least significant weight are replaced by the n digits having the least significant weight of the first variable, the substituted variable thereby comprising a replaced first group of n least significant digits and a second group of m highest significant digits; and (b) third calculating means for (1) retaining as second variable for the calculation of the second password the substituted variable, if the substituted variable and the current value of the second variable are consistent with at least a first predetermined condition, (2) if the first predetermined condition is not satisfied, adjusting in the substituted value the second group of m highest significant digits, the adjusting being dependent from a second predetermined condition, the adjusting generating a substituted and adjusted variable, and (3) retaining as second variable for the calculation of the second password the substituted and adjusted variable.

From these characteristics, it follows that the variables subjected to encryption in the first unit or token and in the server or second unit can be matched to one another in order to produce passwords which are identical to each other or have a predetermined relationship with one another and to do so during each access request despite the drifting which these variables may exhibit. Similarly to an embodiment in the aforesaid copending U.S. application incorporated by reference herein, the calculating means of the second unit can have a different algorithm from that of the calculating means of the first unit, e.g. the algorithm in the second unit can be a decryption algorithm applied to the first password to derive the first variable, generated in the first unit, which is compared in the server with the second variable generated in the second unit. If the variable is time-based, this matching may require no further iteration in the server. If the variable is the number of authentication requests formulated by the first unit, the number of iterations, which could possibly be necessary, would still be limited to a very small value.

BRIEF DESCRIPTION OF THE DRAWINGS

Other characteristics and advantages of the invention will emerge in the course of the description which follows, given merely by way of example and referring to the appended drawings in which:

FIG. 1 is a general diagram of an authentication system according to a first embodiment of the invention;

FIG. 2 is a simplified flowchart illustrating the principle of the running of the operations in a first unit or card belonging to the system according to the invention, when an access request is processed;

FIGS. 3, 3A and 3B show a simplified flowchart illustrating the principle of the running of the operations in a central unit or server belonging to the system according to the invention when an access request is processed;

FIG. 4 is a partial flowchart illustrating a detail of the operation of the server relating to the variation as a function of the duration of use of a card, of a validity range imposed on a synchronization value of the clocks;

FIG. 5 is the flowchart of a first variant of a detail of the operation of the server via which a matching of the system according to the invention to the drifting of the clocks of the cards in the course of their use may be implemented;

FIG. 6 shows a second variant of a matching to the drifting of the clocks in the cards;

FIG. 7 is a flowchart of a detail of the operation of the server pertaining to a routine for monitoring the magnitude of the drift of the clocks over a predetermined time period;

FIG. 8 shows a flowchart of the mode of calculating a key derived from encryption and used for calculating the password;

FIG. 9 shows a block diagram of a second embodiment of the invention;

FIG. 10 shows a flow chart of operations involved in calculating a password according to the second embodiment;

FIG. 11 shows a block diagram of a third embodiment of the invention;

FIG. 12 shows a block diagram of a fourth embodiment of the invention; and

FIGS. 13 and 14 show variations of the operations shown in FIG. 10.

DESCRIPTION OF THE PREFERRED EMBODIMENTS

Represented in FIG. 1 is a very simplified diagram of an access control system according to the invention.

The system is assumed to grant conditional access to a function which in FIG. 1 is symbolized with the rectangle 1. The term "function" should be taken in a very broad sense. It designates any authentication function, in particular an authentication to which access is conditioned by authentication involving authentification entailing verification of the card with the aid of which the request is formulated, and preferably also identification of the person requesting access to the function so as to ascertain whether his request is legitimate.

The function may be of any nature, for example a function for access to premises, to a computerized network or to a computer, to a transaction of a pecuniary nature (television shopping, home banking, interactive televised game, pay television) etc. The function may also involve the authentication of messages.

This so, it may be seen in FIG. 1 that the system according to the invention can, according to a particular embodiment, include at least one first unit 2 referred to here as the "card" and at least one second unit 3. It will be noted that the access control system according to the invention can include a large number of first units and one or more second units, but in any event generally a considerably smaller number of second units than first units. The numbers of units 2 and 3 therefore in no way limit the invention.

The first unit or card 2 is preferably portable and personalized so as to be assigned personally to a given user. It takes for example the form of a pocket calculator, and it bears a public identification number (user ID) 5 indicated diagrammatically in FIG. 1. This number can be registered therein unenciphered and be assigned thereto at the time of its initialization. It can also be formed by the name of the user or any other information specific to him. The personal identification number (PIN) is secret and is usually memorized by the authorized user of the card. In the preferred embodiment, to use the card, the PIN is entered into the card by the user via keypad 6; the card compares the entered PIN with a stored value. If the entered PIN and the stored value match, the user is granted access to the card; if not, the card will not function to generate a password. The user communicates the user ID to server 15 in a manner as described below. The user ID identifies the particular card 2 from among the plurality of such cards in the overall access control system.

The card 2 includes a keypad 6 intended to allow the entry of information, such as for example the personal identification number (PIN) already mentioned, as well as various function buttons 7. It also includes a display screen 8 and is furnished with an integrated circuit 9 which includes in particular a duly programmed microcontroller as well as the customary ROM and RAM memories. Card 2 can have its own source of electrical power, such as battery 9A.

The card 2 also includes a communication device 10 making it possible to communicate with the second unit 3 either directly or via a more or less long-distance transmission link. This device can take numerous forms, for example a DTMF telephone link, a device for transmitting data by infrared rays, a so-called "connected mode" device in which the card is inserted into an appropriate reader or any other transmission device well known in the art.

The second unit 3 encompasses firstly interface means which allow for the provision of communication with the card 2. In the embodiment represented in FIGS. 1 and 2, these interface means are symbolized with a rectangle 12; they may take numerous forms. They may for example be a specially dedicated reader, but they may also take the form of a computer terminal, a personal computer inserted for example into a network etc. Their particular feature is that they can communicate in an appropriate form with the card or cards associated therewith.

The interface means 12 can comprise a keypad 13 and a display screen 14 to enable the user to enter information to be communicated to a part 15 of the second unit 3, such as for example passwords or data to be authenticated and relating to the function 1. However, this information and/or these data can be entered in other ways, in particular automatically without manual intervention by the user, for example simply by entering the card into the interface 12 or else via an infrared ray link with which the card 2 and the interface 12 are endowed.

The interface 12 communicates with the other part 15 (hereafter referred to as the server) of the second unit 3. This communication symbolized by the connection 16 can be done at short-range or long-range by any appropriate means. The information flowing over this connection is in particular the password to be subject to control in the server 15 and possibly data or messages to be authenticated and operated on.

The server 15 comprises in particular a processor 17 and a memory or database 18. The processor is capable of conditionally freeing the functions 1, addressed by the access requests formulated by the various cards, it being possible for these functions to be carried out inside the server (as symbolized in FIG. 1) or outside. It should be noted that the server 15 generally cooperates with a large number of cards by way of interfaces such as the interface 12.

FIG. 2 represents a simplified flowchart of the various operations which unfurl when a request for access to a function is formulated by the user of such a card.

To initiate the procedure, the public identification number (user ID) 5 must firstly be communicated to the server 15. This operation can be carried out in various ways. For example, it may be communicated directly to the server 15 as soon as the card is inserted into the interface 12. It can be punched directly into the keypad 13 of the interface by the user himself, or else into the keypad 6 of the card 2 and be transferred by the link 10. Communication can also be effected via a remote link, such as a telephone line or by Hertzian link.

The user must also input his entitlement by punching, at 20, his personal identification code or PIN code into the keypad 6 of the card 2. The code punched in is compared at 21 with the PIN code stored in memory in the card. In the event of non-agreement, the card 2 refuses to be used by the user at 22, the user possibly being allotted several consecutive attempts before being faced with final refusal, if they are all abortive.

If on the other hand the PIN code entered and the PIN code in memory agree, the program triggers the operation for calculating the password.

This calculation consists in an encryption with the aid of an encryption algorithm which may be secret or public. The algorithm itself may use a public key or a secret key. For example, it may be an algorithm referred to as DES (Data Encryption Standard) by experts in this art, such DES being a public algorithm using a secret key.

According to the concept described in the copending U.S. patent application Ser. No. 08/942,504 entitled "System for Controlling Access to a Function, Using a Plurality of Dynamic Encryption Variables" by the instant inventor and, filed on the same date as the present application and incorporated by reference herein, the algorithm in question uses input parameters dependent on dynamic variables which, in one embodiment, are three in number. Two of them are a variable N stored in a register or counter 24 and which is a function of the number of access requests made by the card, and a time variable T, stored in a register or counter 25. These variables are each input as 32 bits. They may represent the actual value of the number of access requests or of the time or possibly a value resulting from the application of any mathematical function of these variables. The third dynamic variable is a secret encryption key Kn used by the algorithm to encrypt the two variables just mentioned. Other ways of describing the algorithm in question include that the algorithm generates an output as a function of the current values of Kn, N and T or that Kn is encrypted in accordance with a key comprising a value which is a function of N and T. The encryption key Kn is stored in memory in a register 26 and is updated with each access request as explained below in regard to FIG. 8.

The variable to be encrypted T emanates from a time counter 27 which is driven by a base clock 28 of the card whose output is divided in such a way that the counter 27 is incremented with a predetermined temporal resolution, for example every 0.5 seconds. The number contained in the counter 27 is subjected to an extraction operation at 29 through which a predetermined number (8 in the example) of lowest order digits or bits (or more generically the digits in any numeration system including the binary numeration system, the hexadecimal system and so on) are separated therefrom. These bits or digits are discarded and are no longer used for calculating the password. The place value of the digit or bit of immediately higher order as compared with the discarded digits or bits determines a temporal resolution whose corresponding time unit will be referred to as X in what follows, and with which the password can be calculated.

According to one of the aspects of the present invention, there is a provision for making the number of discarded digits adjustable in order to make it possible to choose this resolution which can thus be determined by programming (symbolized by the block 30 in FIG. 2), for example on initializing the card as a function of the degree of security which it is wished to assign thereto or possibly in the course of the use of the card. Indeed, the higher the resolution the shorter will be the duration of validity of a password calculated at a given instant. Since a hacker will thus have less time available to grab and possibly use the password in place of the card's legitimate user, security is strengthened as the resolution is greater.

The number of remaining digits (24 bits in this instance) symbolized at 31 is subjected to a 32-digit complementation operation at 32, through which the corresponding number receives a given number of digits (8 zero value digits in the example) in these higher order place values. The actual number of digits received will of course correspond to the number of digits extracted in extract unit 29. The resulting number T is the second variable which will be subjected to encryption. It is stored in the register 25. It will be noted that the least significant digit or a group of lowest order digits constitutes a time unit which determines the resolution involved. If the system works with binary notation and if the step of the counter 27 is 0.5" as indicated above by way of example, the time unit may have values of 0.5", 1", 2", 4", 8" etc.

The content of the register 24 representing the number of authentication requests (sometimes referred to as the number of events by experts) made is placed in a register 24'.

The two variables T and N thus produced are subjected to encryption according to a password calculation process shown diagrammatically in the chain-dotted rectangle 33.

This calculation entails a concatenation or any other mathematical combination operation at 34 of the two variables N and T from the registers 24' and 25, and then encryption by the algorithm at 35, the latter possibly being a public algorithm (DES) or a secret algorithm. The calculation produces a result A at 36 from which at 37 can be deleted a group of lowest order digits or highest order digits, the number of digits of which is determined through a predetermined value "A-length" or Y (which is chosen at 56 in the example). This operation produces the value Ac.

At 38, this value Ac is completed with the groups of digits of lowest order LSB(N) and LSB(T) of the values contained in the registers 24' and 25 respectively (in the example 4 digits per variable).

The encryption performed by the operations designated overall by the rectangle 33 produces at 39 a new value of the variable N, e.g. the current value N being increased by one unit. Alternatively, the new value of N could be obtained by increasing the current value by two (or any other number) each time. Also, the number of units of incrementation could vary with each access request. Of course, the incrementation must by synchronized with that carried out in server 15. This new value is used for a calculation operation at 40 intended in this example to compute the new value Kn+1 of the third dynamic variable or secret encryption key. The result of this operation at 40 constitutes the new value of the encryption key which is substituted for the previous value of Kn in the register 26 so as to be used when a new authentication request is formulated.

The value obtained at 38 is displayed on the screen 8 of the card 2 in order to be communicated to the server 15 for example by punching the word into the keypad 13 of the interface 12. This communication can also be carried out automatically via links 10 and 16 or through any other appropriate means of communication (block 41).

Referring to FIG. 3, the running of the operations performed by the second unit 3 in order to process a request for authentication, so as to gain access to function 1, formulated as described above by a card 2, will now be described.

The server 15 holds in its memory 18 a table containing several values specific to each card 2 (see also FIGS. 4 to 7). Thus, for each of the cards 1, 2 . . . x of the system, the memory 18 contains in particular the current value Kna of the encryption key and the value Na of the number of requests made with this card, these variables being produced in concert with (i.e., to agree with or to have a predetermined relationship with, e.g., identity) the creation of these same variables in the card. It will be noted in this regard that these variables are never transferred from the card to the server, nor vice versa and therefore never flow over the transmission lines 10 and 16. This of course greatly enhances the security of the system.

When communicating the password composed of the elements Ac, LSB(T) and LSB(N), the user's identification number (user ID) (block 5 of FIG. 1) is also transmitted to the server 15 to enable it to extract from its memory the values Kna and Na relating to the card in question (block 50 of FIG. 3). The components of the password are then retrieved as symbolized at 51, 52 and 53 respectively.

As regards the number of access requests, it should be noted that there may be a drift between the number counted in the card 2 and that counted in the server 15. Indeed, it may happen that the user of the card 2 formulates an authentication request without completing it, stated otherwise, without for example transferring the password to the second unit 3. This could also be done with ill intent by a hacker keen to disturb the system.

It is clear that a disparity such as this between the number accounted for in the card and that counted in the server can only go one way, the excess always appearing in the card.

As moreover the number of requests constitutes one of the variables subjected to encryption in the card and in the server and since moreover in the present embodiment the encryption key depends on this number, a complete access request following one or more uncompleted access requests must give rise in the server to an iterative calculation of the password to compensate for the difference between the numbers accounted on both sides.

The value Na extracted at 54 from the memory 18 is therefore subjected at 55 to a substitution operation during which the value LSB(Na) originating from the memory 18 is replaced by the value LSB(N) originating from the card 2, the rest of the value Na being by assumption the same as that of variable N in the card 2. This operation produces a value symbolized in the block 56 and called Nc. This variable thus comprises a replaced or substituted first group of least significant digits LSB(N) and a group of highest significant digits HSB(N) or value HSB(N).

This value Nc is subjected to a test at 57 in order to determine whether it is strictly less than the value Na extracted from the memory 18. If it is greater than or equal to this value, the test is affirmative and the process passes to a subtraction operation at 58 in order to establish the difference D between the values Nc and Na. The result determines the number of operations required to "make up" the number of password calculations which the server has to perform in order to tally with the corresponding number in the card. If the difference D is equal to zero, there was no difference between the numbers of requests accounted for respectively in the card and in the server, so that no iteration is then required. In the contrary case, the necessary iterations are performed at 59.

If test 57 culminates in a negative response, the value HSB(Nc) is incremented at 60 by one unit in order to recover the right value of Nc (block 61). This value is then ready at 62 to serve as dynamic variable to be encrypted. It is to be noted that the modification of HSB(N) is done in accordance with the particular mode being used for the derivation process for the new value of variable N in module 39 of FIG. 2 described above.

Concrete examples will facilitate understanding this mechanism, the reasoning being followed for convenience under decimal notation. (It will be similar for any other system of notation). It is recalled that N will always be greater than or equal to Na.

If N=Na=22, for example, LSB(N)=LSB(Na) and the test at 57 will be affirmative. No iteration is required and the value Nc is used directly (block 62).

If N=24 and Na=22, LSB(N) transmitted with the password will be 4 and Nc=24. D at 58 will be equal to 2, two iterations will be required in order for Na to become equal to N and Nc likewise equal to 24.

If N=31 and Na=22, LSB(N) transmitted with the password will be 1 and Nc at 56 will be equal to 21. The test at 57 will be negative, since Nc<Na. Consequently, the value HSB(N) will be increased by one unit and Nc becomes equal to 31. D=9 and nine iterations will be required in order for Na to become equal to 31. All the iterations having been performed, D=0 and Nc will have the value suitable for the encryption to be able to be performed (block 62).

It may be noted at this juncture that in all circumstances the number of iterations required will always be relatively low compared with the number of iterations required in the system of the aforesaid U.S. Pat. No. 5,361,062 in which the encryption key is itself a function of time. In the example given hereinabove wherein the value HSB(N) may be incremented by one unit, the maximum allowable difference D is 9 and access will be denied if $D \geq 10$ (in decimal unit). It may be possible to impose a limit on the drifting of the number of access requests accounted for in the server 15 with respect to that enumerated in the card 2. The value D can therefore be subject to a test at 63 to check whether it is greater than a value Dx constituting the maximum allowable difference. If it is observed that this value is exceeded, access will be denied at 64. If the maximum allowable difference Dx is greater than 9 ($Dx \geq 10$), it might be necessary to increment the HSB(N) of Nc by more than one unit. In such an embodiment, access is not denied at block 86 when the test 85 is negative, but the HSB of Nc is incremented by a further unit as shown by the broken lines in FIG. 3A. The difference D between the new value of Nc and Na is calculated (block 58) and access is denied if D>Dx (block 63). If $D \leq Dx$, the process continues as disclosed hereinabove until access is granted, if Advisory Action=Ac (block 85) or is denied (block 64) if Advisory Action≠Ac (block 85) and D>Dx (block 63).

It is to be noted that the value HSB(N) may also be modified in other ways than adding one unit thereto in order to recover the value Nc in accordance with the various alternatives for incrementing N discussed above. I.e., this modification may be made in accordance with any mathematical function.

Before describing the process for establishing the time variable in the server, it should be pointed out that the system according to the invention knows a reference time REF-TIME with respect to which all the cards and the server or servers are referenced. This time is for example the instant at which the system is entered into service on the first occasion (for example 1 Jan. 1996 at 00h00'00").

The server 15 includes a base clock 70 (FIG. 3b) which is in principle considerably more accurate than the clocks of the cards 2. A register 71 contains the difference between the position of this clock and the reference time REF-TIME, this difference being called ΔREF-TIME.

The server establishes at 72 the difference between the value of its base clock and the value ΔREF-TIME, this giving rise to a server clock value 73 established on 32 bits in the present embodiment. This clock value exhibits the same temporal resolution as the value contained in the counter 27 (0.5" in the example described). On initializing each card, a value Card-clk which is the difference between current time and the value ΔREF-TIME is loaded into the register 27 (FIG. 2) of the latter. In other words, if all the clocks were ideal and did not drift, there would at each instant be equality between the values of the registers 27 and 73.

In reality, all the clocks have a drift which is larger for those of the cards than for that of the server or servers of the system.

Examined firstly will be the manner in which the system according to the invention is synchronized with each card at the time of an authentication request so as to culminate in a password which is compatible with that calculated in the card during this authentication request, despite the relatively large drift which the clock of the card may exhibit.

It has already been seen that the password calculated in the card is accompanied by a group of digits LSB(T), when it is transmitted to the server. This group of digits (four bits in the example described) constitutes a synchronization information item which is used as follows in the server 15.

The current value of the register 73 is subjected to several operations at 74 which are identical to those performed in the card 2 and are shown diagrammatically by the blocks 29 to 32 of FIG. 2. They are therefore not detailed in FIG. 3B.

The resulting value Ta is symbolized in the block 75. A group of least significant digits LSB(Ta) (four bits in the example; value Ts) is deleted from this resulting value and replaced by the value LSB(T) of block 53, this operation being symbolized by the block 76. This substitution produces a substituted value Tc1 written into the block 77. It therefore includes the synchronization value LSB(T) sent by the card to the server during transfer of the password Ac, this value constituting a group of least significant digits. The remainder of the digits of the substituted value Tc1 are a group of highest significant digits HSB(T).

In its memory 18, the server contains an information item or range Tv (which is Ta-T) for the synchronization value which therefore is subject to a threshold. According to two different calculating protocols, this range Tv is respectively as follows:

$-5 \leq Ts \leq +4$ (block 78)

or $Ta-5 \leq Tc1$ (or Tc2 and or Tc3) $\leq Ta+4$

Ts is the difference between the value Ta and the value Tc1 determined in particular by the value (LSB)T originating from the card 2. It should be noted that the range Tv is preferably adjustable, as described below in regard to FIG. 4. The value Tc1 contained in the block 77 is subjected to a synchronization process by which it will be altered, if appropriate, as a function of the range Tv in order to compensate for the drift which the counter or register 27 exhibits with respect to the counter or register 73 of the server 15.

This process begins with a test at 79 to check whether the value Tc1 is compatible with the range Tv. As concerns the first mentioned calculating protocol, this operation includes, firstly, calculating the difference between the values Ta and Tc1, this difference being subjected to a comparison with the first validity range Tv mentioned above.

If the response to the test 79 is affirmative, this means that the difference falls within the range and that there is therefore compatibility with the latter. Indeed, under these conditions, Ta=Tc1, so that Tc1 can be used at 80 for the encryption in the guise of variable Tc (FIG. 3A).

In the contrary case, an operation at 81 removes in the value Tc1 one unit from the group of digits HSB(T) and the result Tc2 is again subjected to a test at 82 to check whether it is compatible with the range Tv. If the answer is yes, it is this value Tc2 which will be adopted at 80 for the encryption in the form of the variable Tc.

In the contrary case, an operation which is symbolized at 83 increments in the value Tc1 by one unit the least significant digit of the group HSB(T). The result Tc3 is again subjected to a test at 84 to check whether it is compatible with the validity range. If the answer is yes the result is adopted at 80 in the guise of variable Tc in order to perform the encryption. The tests 82 and 84 are similar to the test 79 and they therefore include an operation of calculating the difference between the value Ta and the altered or adjusted value, Tc2 and Tc3 respectively, and then a comparison of the difference with the validity range Tv.

A concrete example will make it possible to understand this synchronization process according to the first protocol which produces the current value Tc which can be used for calculating the password in the server 15. This example is summarized in Table 1 below and is based on decimal notation (Advisory Action being the password calculated in the server (blocks 33a and 36a)):

TABLE 1

| Register 25 (Tc) card | LSB(T) | Register 75 (Ta) server | Calculation tests 79, 82 and 84 |
|---|---|---|---|
| ... 22 | 2 | ... 25 | Tc1 = ... 22<br>Ta − Tc1 = +3→ calculate |
| ... 19 | 9 | ... 22 | Advisory Action<br>Tc1 = ... 29<br>Ta − Tc1 = −7<br>Tc2 = ... 19<br>Ta − Tc2 = 3→ calculate |
| ... 22 | 2 | ... 18 | Advisory Action<br>Tc1 = ... 12<br>Ta − Tc1 = 6<br>Tc2 = ... 02<br>Ta − Tc2 = 16<br>Tc3 = ... 22<br>Ta − Tc3 = −4→ calculate |

It is therefore seen that in this example, the system accepts a validity range of 10 time units X which is centered on the value Ta which is in fact the content of the register 75. If the time unit X is 128" or 2'8" for example, the validity range extends over 21'20" Supposing that the maximum drift per day of a card is ±0.5 sec. and the life time of a card is two years, the maximum drift of the card will be ±6 minutes. Supposing also that the error when initializing the clock counter 27 of the card is ±1 minute and the error in the server clock 73 with respect to the reference time at any moment is ±1 minute, the maximum difference at any moment between the card clock and the server clock may be ±8 minutes. This maximum difference (±8 minutes) is within the validity range (21'20") mentioned hereinabove. If the allowed validity range is set to be more than 10 times unit x, it would be necessary to perform a procedure similar to that followed for the access number N when the maximum allowable difference Dx is >9. This means that the HSB(T) could be incremented or decremented by more than one unit. Naturally, in that case, if the test performed at 85 on the basis of the incremented value is negative, this test should be repeated on the basis of the decremented value, provided that both the incremented and the decremented value fall within the allowed validity range. It is to be noted further that, like the procedure followed for the access number N, the time related calculation may involve, instead of adding or subtracting one unit to the value HSB, any other modification of that value involving any mathematical function.

It is also to be noted that if the loss of synchronization with respect to either the access number N or the time T exceeds the above-discussed correctable ranges, the card and the server will not generate matching passwords. The card should then be re-initialized before further use.

Calculation of the password in the server 15 with the aid of the variables Nc and Tc as well as of the encryption key Ka runs in the same manner as in the card by following the operations shown diagrammatically in the rectangle 33 of FIG. 2 (block 33a of FIG. 3A). This procedure gives rise to the creation of the password Advisory Action at 36a. Advisory Action is subjected to a comparison test at 85 to check whether it is equal to password A transmitted by card 2 (block 51).

If the test substantiates an inequality, authentication is denied at 86. Otherwise, access to the function 1 is granted. A new value of the number of access requests is calculated at 87 (Na=Nc+1) and written into the memory 18. The new value of the key Ka is likewise calculated at 88 and written into the memory 18, the two new values replacing the previous ones therein at the addresses corresponding to the card which has just formulated the authentication request. The calculation of the new value of Na and Ka are performed in like manner to the calculation of the new values of N and K in the card, as described above.

The extent of the validity range Tv of relevance above is determined by the temporal resolution, that is to say, by the chosen time unit X (operations 29 to 31 in the card and overall the operation 74 in the server). Thus, for example, if a time unit of 2'8" is used, the range extends around the value Ta as follows:

$$-10'40" \leq Ta \leq +8'32".$$

If the time unit is doubled, the range becomes:

$$-21'20" \leq Ta \leq +17'4".$$

FIG. 4 represents an alternative embodiment of the invention in which the validity range Tv is made variable as a function of the time of use of each card. To this end, for each of the cards, the memory 18 of the server holds a value representing its date of entry into service or of initialization. This value is extracted therefrom at 93 upon each access request following operation 50 (FIG. 3A). The position of the clock 70 of the server 15 is algebraically combined in 94 with this value and the result is submitted to a test 90 in order to check whether a predetermined period of time (1 year for example) has elapsed since the date of entry into service. As long as the response to the test remains negative, the range Tv established at 78 (FIG. 3B) is fixed, at 91, inside relatively small predetermined limits, for example $-3 \leq Ts \leq +2$. If the test turns out to be affirmative, one year has elapsed since the entry of the card into service so that a larger range can be allowed, the clock of the card then having undergone a drift which remains within allowable limits. The range is defined with new limits at 92, fixed for example at $-5 \leq Ts \leq +4$. Of course, the limits of the range Tv may be amended in other ways with the aid of values other than those just indicated.

The synchronization process executed in the server 15 upon each access request corresponds to a certain synchronization value which represents the difference TOffset between the clocks of the card 2 and of the server 15 at the time at which the access request is formulated. This value TOffset can be used, upon each authentication request, to adjust the time value used in the server for calculating the password.

Two other alternatives, represented in FIGS. 5 and 6, of the system according to the first embodiment of the invention make it possible to implement this reset process and the following Table 2 illustrates this process through a numerical example in terms of time units X, with TOffset 1 and TOffset 2 being respectively the drifts for a given request and for an immediately following request, it being also noted that in this example the second protocol, the second range as mentioned above, are used (only the lowest order digits of the respective values are indicated):

TABLE 2

| Reg 25<br>Tc card | LSB(T) | Reg 75<br>Ta<br>server | TOffset 1 | Range Tv<br>allowed<br>for Tc | TOffset 2 |
|---|---|---|---|---|---|
| 22 | 2 | 23 | 0 | 18–27 | −1 |
| 18 | 8 | 23 | −1 | 17–26 | −5 |
| 15 | 5 | 23 | −5 | 13–22 | −8 |
| 19 | 9 | 23 | −8 | 10–19 | −4 |
| 16 | 6 | 23 | −4 | 14–23 | −7 |
| 11 | 1 | 23 | −7 | 11–20<br>06–15 | −12 |

The memory 18 of the server 15 (FIG. 5) includes a section in which particular values Δref-time are recorded for all the cards of the system. These values are updated for each card at the moment at which a request is completed. To do this, the general value ΔREF-TIME (block 71) of the system is combined additively at 100 with the value TOffset of the request in progress (block 101) and the result of this operation is stored in the memory 18 at an address specific to the relevant card. During a subsequent request, this value is extracted from the memory 18 and subtracted at 102 from the current value of the clock 70 of the system and the result is placed in the register 73 of the server so as to be used for this request. This process is run individually for each card upon each request made therewith.

In the embodiment represented in FIG. 6, the value T Offset itself (block 110) observed for a given card during an access request is recorded in the memory 18 of the server 15 at the moment at which this request is completed. It is extracted therefrom for the following request so as to be combined additively at 111 with the value contained in the register 73 to give rise to the corrected value of the server clock value (block 112). The latter is used during this following request for the calculation performed in the server 15.

FIG. 7 represents another embodiment of the invention making it possible to monitor the movements of the drift and if appropriate, to draw conclusions therefrom as regards the opportuneness of authorizing or denying a subsequent use of the card.

For each card, the memory 18 of the server 15 stores the drift value and the position of the clock 70 of the server which were valid during the previous request. The drift value is used as represented in FIG. 6 to give the altered value (block 112). The previous value of the clock 70 is subtracted from the current value of the latter at 113 to give a value ΔT which represents the time which has elapsed since the latest request (block 114). The server 15 calculates the value Tc as described previously in regard to FIG. 3B, the corresponding set of calculation operations being summarized in FIG. 7 by block 115. Algebraic combination (block 116) of the result of the calculation and of the value of the block 73 then gives the new value of the drift (block 117) observed during the request in progress. This value is combined algebraically with the previous drift value extracted from the memory 18 (block 118) and the result ΔOffset (block 119) is compared with the value ΔT obtained at 114 in the course of a test at 120 which checks whether the deviation observed corresponds to predetermined consistency criteria. For example, it is possible to assert that the drift may not exceed a given value during a predetermined time of use or else an anomaly observed by the server 15 leads to rejection of the card at 121, preventing any further access request. The new clock and drift values are recorded in the memory 18 at the addresses of the relevant card if the test at 120 turns out to be affirmative (blocks 122 and 123, respectively) so as to be used for the subsequent request.

Table 3 below shows a concrete example of this drift monitoring, the values being in time units of 64" and the calculation taking into account the time inaccuracies inherent in the system (the values indicate only the lower order digits and the calculation is made according to the second protocol here above):

TABLE 3

| Reg 25 Tc | Reg 75 Ta | Drift card 2 | Range Tv allowed | Dri. n + 1 | Δ offset | ΔT (sem.) |
|---|---|---|---|---|---|---|
| 22 | 23 | 0 | 18–27 | −1 | −1 | 3 |
| 18 | 23 | −1 | 17–26 | −5 | −4 | 8 |
| 15 | 23 | −5 | 13–26 | −8 | −3 | 7 |
| 19 | 23 | −8 | 10–19 | −4 | +4 | 7 |
| Detection of anomaly in the direction of drift | | | | | | |
| 16 | 23 | −4 | 14–23 | −7 | −3 | 8 |
| 11 | 23 | −7 | 11–20 | −12 | −5 | 1 |
| Access denied, anomaly in the drift too large | | | | | | |

FIG. 7 illustrates yet another embodiment of the invention according to which the value ΔOffset is used to recenter the validity range on the value of the block 73. For example, if the drift is in the negative direction, the range will be $-7 \leq Ts \leq +2$ and in the contrary case it will be $-3 \leq Ts \leq +6$, these values being given here merely by way of example, of course. Thus, the value obtained at 119 in FIG. 7 will serve to define the new validity range at 124, it being possible to carry out the matching upon each new request.

FIG. 8 shows how the encryption key Kn (Kna) can drift from one request to another depending on the value Nn (Nna) of the number of requests made, with which it can be combined logically, and then encrypted to give rise to the encryption key Kn+1 (Kan+1) used during the next request.

These operations are performed in concert both in the card 2 and in the server 15. Firstly, the values Nn+1 and Kn (blocks 130 and 131) are subjected at 132 to a logical combination operation, for example an EXCLUSIVE-OR combination, or alternatively to any other mathematical combination. The resulting intermediate variable Z is subjected to encryption at 133 with the aid of a known or public algorithm which may possibly be the same as that used at 33 and 33a (FIGS. 2 and 3A). The encryption can be performed with the aid of an encryption key which is preferably the value of the current dynamic variable Kn, although any other secret key Q (block 134) may also be used.

The result of the encryption operation 133 is the new value Kn+1 of the encryption key which will be used during the next access request (block 135).

The second embodiment of the invention will now be described in detail with reference to FIGS. 9 and 10 and will be explained primarily in terms of its differences from the first embodiment. Elements corresponding to elements of the first embodiment will be indicated with the same reference numerals, except incremented by 200; e.g., first unit 202 of the second embodiment corresponds to first unit 2 of the first embodiment. Except as explicitly set forth herein, any features of the first embodiment can be incorporated into the second embodiment.

As has been explained above, in the first embodiment, first unit 2 is a card or token, preferably portable, having its own source of electrical energy such as battery 9A. Card 2 also includes keypad 6, display source 8 and processor (e.g., integrated circuit) 9 and includes the ability to produce clock pulses to provide variable T.

The mechanisms described in the first embodiment can also be embedded in any other device possessed by the user, and offering the same characteristics, i.e., having its own source of energy 9A, a keypad 6, processor 9, the ability to produce clock pulses and a display 8 or a way to directly transmit the password to the second unit (communication channel). Such a device can be, e.g., a personal digital assistant (PDA), a phone, or a cellular phone.

The second embodiment allows many of these features to be removed from the card itself, thus simplifying the card. As shown in FIG. 9, the second embodiment includes first unit 202 and second unit 203. First unit 202 includes smart card 140, smart card reader 141 and a computer such as personal computer (PC) 142 to which smart card reader 141 is connected by a suitable interface such as an RS-232 port, a parallel port, a keyboard or a PCMCIA interface.

Integrated circuit (processor) 209 of smart card 140 stores the variable Nn in register (event counter) 224 and secret dynamic encryption key Kn in register 226 and executes cryptographic algorithm ALGO. Keypad 206 and display screen 208 of first unit 202 are not located on card 140, but instead are provided by the keyboard and display screen of personal computer 142. Computer 142 also includes clock 143 for incrementing counter (register) 228 which provides variable T representing the time.

Second unit 203 can be the same as second unit 3 of the first embodiment.

In this embodiment the password generated by the smart card is transmitted directly to the PC. Thus, the use of the PC screen to display the password is optional. The password, once in the PC, can be transmitted directly to the host (second unit) without being presented to the user.

FIG. 10 shows a flow chart of operations involved in calculating the password in first unit 202 and correspond, in a simplified form, to the left side of the flow chart of FIG. 2.

More particularly, in FIG. 10, once the user has been identified by first unit 202 through the introduction of the secret personal identification number or PIN into keypad 206, PC 142 reads the content Nn of event counter 224 in smart card 140. At 227, Nn and variable T stored in counter 228 of PC 142 are concatenated or otherwise processed, as disclosed with respect to the first embodiment, to produce an input parameter or challenge of, for example 64 bits. This challenge is input by computer 142 into smart card 140 and is encrypted by the algorithm ALGO performed at 235 using encryption key Kn stored in register 226.

The encryption performed at 235 generates at 236 the password A which is formatted and displayed on screen 208 at 144. This password A is communicated to server 215 of second unit 203 as disclosed above with reference to FIG. 2.

Of course, if personal computer 142 communicates password A directly to second unit 203, as by a modem, password A need not be displayed to the user.

The encryption performed at 235 also causes incrementation at 239 of the value of N, and the new value Nn+1 is stored in register 224 of smart card 140. The incrementation can be an incrementation by one or another sort of incrementation, as described above with respect to the first embodiment. The incremented number Nn+1 is also subjected to a calculation operation at 240 to compute a new value Kn+1 for the third dynamic variable or secret encryption key; this calculation operation has also been described with respect to the first embodiment.

There is another embodiment shown in FIG. 13 that simplifies the software implemented on the PC and limits the exchange of information between the PC and the smart card and the display. What is missing in the smart card is the clock counter 228 (T). All the other functions involved in the generation of the password can be implemented into the smart card.

Once the user has been identified by first unit 202 through the introduction of the secret personal identification number or PIN into keypad 206, PC 142 sends variable T stored in counter 228 to smart card 140. At 227, Nn and variable T are concatenated or otherwise processed, as disclosed with respect to the first embodiment, to produce an input parameter or challenge of, for example 64 bits. This challenge is encrypted by the algorithm ALGO performed at 235 using encryption key Kn stored in register 226.

The encryption performed at 235 generates at 236 the password A which is formatted and displayed on screen 208 at 144. This password A is communicated to server 215 of second unit 203 as disclosed above with reference to FIG. 2. Of course, if personal computer 142 communicates password A directly to second unit 203, as by a modem, password A need not be displayed to the user.

The encryption performed at 235 also causes incrementation at 239 of the value of N, and the new value Nn+1 is stored in register 224 of smart card 140. The incrementation can be an incrementation by one or another sort of incrementation, as described above with respect to the first embodiment. The incremented number Nn+1 is also subjected to a calculation operation at 240 to compute a new value Kn+1 for the third dynamic variable or secret encryption key; this calculation operation has also been described with respect to the first embodiment.

A simplified version of this embodiment, shown in FIG. 14, could be to eliminate the event counter and key derivation, i.e., the other dynamic variables besides T. This simplified version distinguishes from the prior art because the clock counter is not generated where the algorithm and the keys are stored and implemented. The prior art discloses implementations in which the clock generation is performed where the algorithm and keys are stored. One embodiment of the present invention involves a "virtual token" based on a time variable generated outside the smart card by the PC or the intelligent reader and transmitted to the smart card to produce the password using a static key stored in the smart card (FIG. 14). It is advantageous because no permanent power supply in the card is needed. As a still further simplification, the key can be static, as in FIG. 14.

Smart card reader 141 shown in FIG. 9 is a passive or "dumb" smart card reader; that is, it simply transmits data between smart card 140 and PC 142. Alternatively, a smart card reader used in the present invention could be an active or "intelligent" smart card reader and could be portable. The third embodiment of the invention, directed to the use of such an "intelligent" smart card reader, is shown in FIG. 11.

As shown in FIG. 11, in second unit 302, "intelligent" smart card reader 341 reads smart card 140 of the second embodiment and is adapted for use with second unit 303, which can be like second unit 3 or 203. Smart card reader 341 comprises keyboard 306, display screen 308, register 328 and clock 343 corresponding to keyboard 206, display screen 208, register 226 and clock 143 and could also include its own source of electrical energy, such as battery 399, corresponding to battery 9A. Such a smart card reader can perform the functions shown for PC 142 in FIG. 9.

As described above, the smart card reader could be configured to supply T, and the smart card could be configured to perform the other operations of the first unit. Alternatively, as described above, the clock could be provided by the PC (such as PC 142) to smart card reader 341, thus eliminating the need for clock 343 in reader 341.

A first unit like first unit 2, 202 or 302 could also be implemented as a personal computer programmed with appropriate software to perform the calculations shown in FIG. 10 for both smart card 140 and PC 142. In such a case, the smart card could be done away with. The first unit could also be implemented in a cellular or other telephone or a personal digital assistant (PDA). Incorporation of the first unit into a cellular telephone would have particular utility in terms of avoiding cellular-telephone fraud, which is rampant.

Such a first unit is implemented in the fourth embodiment, shown in FIG. 12. Elements of the fourth embodiment corresponding to elements of the previous embodiments are indicated by otherwise similar reference numbers numbered in the 400's.

First unit 402 is implemented completely in personal computer 442. Second unit 403 can be like the second unit of any previous embodiment.

Personal computer 442 includes keyboard 406, display screen 408 and clock 443. The personal computer is configured in hardware, software or both to implement registers 424, 426 and 428.

It will be appreciated by persons skilled in the art that the present invention is not limited to what has been particularly shown and described herein and in particular is not limited to the embodiments set forth above. Rather, other modifications can be made within the scope of the invention. Also, modifications disclosed separately can be combined. Therefore, the scope of the present invention is defined only by the claims which follow.

I claim:

1. A system for authentication of individuals and/or messages, including at least one first unit personalized for an individual and at least one second verification unit capable of delivering an authentication function authenticating said individual and/or said messages, (a) said first unit comprising:

first generating means for generating at least a first variable;

first calculating means for producing a first password as a function of at least said first variable;

transmission means for transmitting said first password to said second unit;

(b) said second unit comprising:

second generating means for, in response to an authentication request made by way of a specified one of said first units, generating at least a second variable assigned to this first unit;

second calculating means for producing a second password as a function of at least said second variable, said first and second variables being produced in concert, but independently in said first and second units;

means for comparing said first and second passwords;

delivering means for, in the event of a predetermined consistency of said passwords, delivering said authentication function;

said transmission means being configured so as to transmit with said first password n digits having the least significant weight of said first variable from said first unit to said second unit;

(c) said second unit further comprising:

j) substituting means for, based on the current value of said second variable, generating a substituted value wherein n digits having the least significant weight are replaced by said n digits having the least significant weight of said first variable, said second variable thereby comprising a replaced first group of n least significant digits and a second group of m highest significant digits;

jj) third calculating means for k) retaining as second variable for the calculation of said second password said substituted variable, if said substituted variable and said current value of said second variable are consistent with at least a first predetermined condition, kk) if said first predetermined condition is not satisfied, adjusting in said substituted value by one unit said second group of m highest significant digits, said adjusting being dependent from a second predetermined condition, said adjusting generating a substituted and adjusted variable, and kkk) retaining as second variable for the calculation of said second password said substituted and adjusted variable.

2. The system as claimed in claim 1 wherein said third calculating means further comprises:

means for implementing said first predetermined condition configured so as to determine if said substituted variable is higher than or equal to said current value of said second variable; and means for implementing said second predetermined condition configured so as to increment by one unit said second group of m highest significant digits, if said substituted variable is strictly lower than said current value of said second variable, thereby generating a substituted and incremented value, and for retaining said substituted and incremented value as second variable.

3. The system as claimed in claim 1, wherein said third calculation means further comprises:

i) means for implementing said first predetermined condition configured so as to:

j) calculate a first difference between said current value of said second variable and said substituted variable, jj) determine if said first difference is within a range the extent of which is at the most equal to the number of units having the highest weight $p_n$ in said first group of n digits, as represented by the digit having the lowest weight $p_{n+1}$ in said group of m highest significant digits, jjj) retaining as second variable said substituted variable if said difference is within said range, and ii) means for implementing said second predetermined condition configured so as to:

k) adjust by one unit in a first direction said lowest weight $p_{n+1}$, if said difference is outside said range thereby generating a first substituted and adjusted variable, kk) calculate a second difference between said current value of said second variable and said first substituted and adjusted variable, kkk) determine if said second difference is within said range, kkkk) retain as a second variable said first substituted and adjusted variable if said second difference is within said range, kkkkk) adjust by one unit in a second direction opposed to said first direction said lowest digit $p_{n+1}$ if said second difference is outside said range thereby generating a second substituted and adjusted variable, and kkkkkk) retaining as a second variable said second substituted and adjusted variable.

4. The system as claimed in claim 1, wherein said third calculating means further comprises:

i) means for defining a range of values the extent of which is at the most equal to a number of units having the highest weight $p_n$ in said first group of n digits, as represented by the digit having the lowest weight $p_{n+1}$ in said group of m highest digits;

ii) means for generating first and second checking values, said checking values being respectively equal to the algebraic sum of said current value of said second variable and the lowest limit value of said range and said current value of said second variable and the highest limit of said range;

iii) means for implementing said first predetermined condition configured so as to:

j) determine if said substituted variable is between said first and second checking values;

jj) retain as a second variable said substituted variable if said substituted variable is between said first and second checking values;

said third calculating means further comprising:

iiii) means for implementing said second predetermined condition configured so as to:

k) adjust by one unit in a first direction said lowest weight pn+1, if said substituted value is outside said first and second checking values thereby generating a first substituted and adjusted variable, kk) determine if said first substituted and adjusted variable is between said first and second checking values;

kkk) retain as a second variable said first substituted and adjusted variable if said first substituted and adjusted variable is between said first and second checking values;

kkkk) adjust by one unit in a second direction opposed to said first direction said lowest digit $p_{n+1}$ if said first substituted and adjusted variable is outside said first and second checking values thereby generating a second substituted and adjusted variable, and kkkkk) retain as a second variable said second substituted and adjusted variable.

5. The system as claimed in claim 2, wherein said third calculating means further comprises means for subtracting said current value of said second variable from said substituted variable or, as the case may be, from said substituted and adjusted variable, thereby generating a difference value, said second calculating means further comprising means for iteratively calculating said second password as many times as the value of said difference.

6. The system as claimed in claim 2 wherein said first generating means are configured so as to generate said first variable as a function of the number of authentication requests made by said at least one first unit, and wherein said second generating means are so configured as to generate said second variable as a function of the number of authentication request received by said second unit from said at least one unit.

7. The system as claimed in claim 1, wherein said first and second generating means are configured so as to generate respectively said first and second variables as first and second time dependent variables.

8. The system as claimed in claim 7, wherein each of said first and second generating means further comprises:
a base clock for supplying a basic clock signal composed of successive pulses having a predetermined frequency,
counter means for counting said pulses,
digit canceling means for canceling a predetermined number of the least significant digits from the contents of said counting means, thereby generating respectively in said at least one unit a first intermediate time value and in said second unit a second intermediate time value, whereby said first and second time dependent variables are generated respectively as functions of said first and second intermediate time values.

9. The system as claimed in claim 8, wherein each of said first and second generating means further comprises adjusting means for regulating said predetermined number of least significant digits to be canceled from the contents of said counting means.

10. The system as claimed in claim 8, wherein said first and second generating means each further comprises:
means for adding a predetermined number of digits of zero value to said intermediate time values at the side of the highest weight thereof.

11. The system as claimed in claim 3, wherein said second unit further comprises:
storing means for storing the date of initialization of each of said first units,
means for, at the time an authentication request is formulated with said at least one first unit, comparing the time period elapsed between the date relevant for said at least one first unit and stored in said storing means and at least a predetermined time interval, and
means for increasing said range when said elapsed time interval exceeds said predetermined time interval.

12. The system as claimed in claim 4, wherein said second unit further comprises:
storing means for storing the date of initialization of each of said first units,
means for, at the time an authentication request is formulated on said at least one first unit, comparing the time period elapsed between the date relevant for said at least one first unit and stored in said storing means and at least a predetermined time interval, and
means for increasing said range of values when said elapsed time interval exceeds said predetermined time interval.

13. The system as claimed in claim 1, wherein said third calculating means further comprises:
means for, upon completion of each authentication request formulated with said at least one first unit, algebraically summing said current value of said second variable and said substituted variable or, as the case may be, said substituted and adjusted variable so as to generate an offset value,
means for storing said offset value as a current offset value pertaining to said at least one first unit, said second calculating means being so arranged as to, during at least a subsequent authentication request formulated with said at least one first unit calculate said substituted variable, or, as the case may be, said substituted and adjusted value, as a function of said current offset value.

14. The system as claimed in claim 13 wherein said third calculating means are so arranged as to adapt said first and second predetermined conditions as a function of said current offset value.

15. The system as claimed in claim 13, wherein said first and second generating means are configured so as to generate respectively said first and second variables as first and second time dependent variables,
said first and second generating means each further comprises:
a base clock for supplying a basic clock signal composed of successive pulses having a predetermined frequency,
counter means for counting said pulses, said first and second time dependent variables being generated respectively as functions of the contents of said counter means,
said storing means being so arranged as to store, for each of said second units a compensating value for compensating the contents of said counter means of said second unit against drift of the base clocks of said first and second units, respectively, and
said third calculating means further comprising means for generating said compensating value as a function of said time offset value.

16. The system as claimed in claim 15 wherein said third calculating means further comprises:
first determining means for determining the time interval between a current authentication request formulated by said at least one first unit and a subsequent authentication request formulated by said unit,
second determining means for determining the difference between said time offset value calculated upon completion of said current request and said time offset value calculated upon completion of said subsequent request,
means for refusing said subsequent authentication request when said difference between said time offset values exceeds a predetermined level as compared with said time interval as determined by said first determining means.

17. A system for authentication of individuals and/or messages, including at least one first unit personalized for an individual and at least one second verification unit capable of delivering an authentication function authentifying said individual and/or said messages,
(a) said first unit comprising:
first generating means for generating at least first and second variables,
first calculating means for producing a first password as a function of at least said first and second variables;
transmission means for transmitting said first password to said second unit;
(b) said second unit comprises:
second generating means for, in response to an authentication request made by way of a specified one of said first units, generating at least third and fourth variables assigned to this first unit;
second calculating means for producing a second password as a function of at least said third and fourth variables, said first and second variables and said third and fourth variables being respectively produced in concert, but independently in said first and second units;

means for comparing said first and second passwords;

delivering means for, in the event of a predetermined consistency of said passwords, deliver said authentication function;

said transmission means being configured so as to transmit with said first password n digits having the least significant weight of said first and second variables from said first unit to said second unit;

(c) said second unit further comprising:

j) substituting means for, based on the current value of said third and fourth variables respectively, generate first and second substituted values each wherein n digits having the least significant weight are replaced respectively by said n digits having the least significant weight of said first and second variables, said third and fourth variables thereby each comprising a replaced first group of n least significant digits and a second group of m highest significant digits;

jj) third calculating means for:

k) retaining respectively as third variable for the calculation of said second password said first substituted variable, if said first substituted variable and said current value of said third variable are consistent with at least a first predetermined condition, kk) if said first predetermined condition is not satisfied, adjusting in said first substituted value by one unit said second group of m highest significant digits, said adjusting being dependent from a second predetermined condition, said adjusting generating a first substituted and adjusted variable, and kkk) retaining as third variable for the calculation of said second password said first substituted and adjusted variable.

jjj) said third calculating means being also arranged so as to:

l) retain as fourth variable for the calculation of said second password said second substituted variable, if said second substituted variable and said current value of said fourth variable are consistent with at least a third predetermined condition, ll) if said third predetermined condition is not satisfied, adjust in said second substituted value by one unit said second group of m highest significant digits, said adjusting being dependent from a fourth predetermined condition, said adjusting generating a second substituted and adjusted variable, and lll) retain as fourth variable for the calculation of said second password said second substituted and adjusted variable.

18. The system as claimed in claim 17, wherein:

said first generating means are configured so as to generate said first variable as a function of the number of authentication requests made by said at least one first unit, said second generating means are so configured as to generate said third variable as a function of the number of authentication request received by said second unit from said at least one first unit, and said first and second generating means are configured so as to generate respectively said second and fourth variables as second and fourth time dependent variables.

19. The system as claimed in claim 18, wherein said first and second calculating means are so arranged as to calculate said encryption keys used in said at least one first unit and said second unit as dynamic variable encryption keys respectively as functions of said first and third variables.

20. The system as claimed in claim 1, wherein said first encryption algorithm and said second encryption algorithm have a predetermined relationship with one another so as to produce said passwords having said predetermined consistency with one another.

21. The system as claimed in claim 17, wherein said first encryption algorithm and said second encryption algorithm have a predetermined relationship with one another so as to produce said passwords having said predetermined consistency with one another.

22. The system as claimed in claim 1, wherein the first unit is a portable device comprising a source of electrical energy.

23. The system as claimed in claim 1, wherein the first unit is a portable device comprising a card.

24. The system as claimed in claim 1, wherein said first unit comprises:

a card reader; and a card adapted for being read by said card reader.

25. The system as claimed in claim 24, wherein:

the first and second generating means generate the first and second variables, respectively, as first and second time-dependent variables;

the card comprises at least a first portion of the first calculating means, the first portion for producing the first password;

the first unit further comprises a processor in communication with the card, the processor comprising the first generating means for producing the first time-dependent variable; and the first time-dependent variable is communicated to the at least first portion of the first calculating means in the card.

26. The system as claimed in claim 25, wherein the processor is disposed in the card reader.

27. The system as claimed in claim 25, wherein the first unit further comprises a computer and the processor is disposed in the computer.

28. The system as claimed in claim 25, wherein the first unit further comprises one of a personal digital assistant and a telephone device and the processor is disposed in said one of a personal digital assistant and said telephone device.

29. The system as claimed in claim 1, wherein the first unit is a computer programmed to function as the first generating means and the first calculating means.

30. A method for authentication of at least one user or a message from said at least one user, said method comprising:

(a) generating at least a first variable;

(b) producing a first password as a function of at least said first variable;

(c) in response to an authentication request made by a specified one of said at least one user, generating at least a second variable assigned to this at least one user;

(d) producing a second password as a function of at least said second variable, said first and second variables being produced in concert, but independently in steps (a) and (c);

(e) comparing said first and second passwords;

(f) in the event of a predetermined consistency of said passwords, delivering said authentication function;

said first password being transmitted with n digits having the least significant weight of said first variable;

step (c) comprising:

(i) based on the current value of said second variable, generating a substituted value wherein n digits having the least significant weight are replaced by said n digits having the least significant weight of said first variable, said second variable thereby comprising a replaced first group of n least significant digits and a second group of m highest significant digits;

(ii) retaining as second variable for the calculation of said second password said substituted variable, if said substituted variable and said current value of said second variable are consistent with at least a first predetermined condition;

(iii) if said first predetermined condition is not satisfied, adjusting in said substituted value by one unit said second group of m highest significant digits, said adjusting being dependent from a second predetermined condition, said adjusting generating a substituted and adjusted variable; and (iv) retaining as second variable for the calculation of said second password said substituted and adjusted variable.

31. The method as claimed in claim 30 wherein:

said first predetermined condition comprises determining if said substituted variable is higher than or equal to said current value of said second variable; and second predetermined condition comprises incrementing by one unit said second group of m highest significant digits, if said substituted variable is strictly lower than said current value of said second variable, thereby generating a substituted and incremented value, and retaining said substituted and incremented value as second variable.

32. The system as claimed in claim 30, wherein:

said first predetermined condition comprising:

(i) calculating a first difference between said current value of said second variable and said substituted variable, (ii) determining if said first difference is within a range the extent of which is at the most equal to the number of units having the highest weight $p_n$ in said first group of n digits, as represented by the digit having the lowest weight $p_{n+1}$ in said group of m highest significant digits; and (iii) retaining as second variable said substituted variable if said difference is within said range, and said second predetermined condition comprises:

(i) adjusting by one unit in a first direction said lowest weight $p_{n+1}$, if said difference is outside said range thereby generating a first substituted and adjusted variable, (ii) calculating a second difference between said current value of said second variable and said first substituted and adjusted variable, (iii) determining if said second difference is within said range, (iv) retaining as a second variable said first substituted and adjusted variable if said second difference is within said range, (v) adjusting by one unit in a second direction opposed to said first direction said lowest digit $p_{n+1}$ if said second difference is outside said range thereby generating a second substituted and adjusted variable, and (vi) retaining as a second variable said second substituted and adjusted variable.

33. The method as claimed in claim 30, wherein:

a range of values is defined, the extent of which is at the most equal to a number of units having the highest weight $p_n$ in said first group of n digits, as represented by the digit having the lowest weight $p_{n+1}$ in said group of m highest digits;

first and second checking values, said checking values are generated, being respectively equal to the algebraic sum of said current value of said second variable and the lowest limit value of said range and said current value of said second variable and the highest limit of said range;

said first predetermined condition comprises:

(i) determining if said substituted variable is between said first and second checking values;

(ii) retaining as a second variable said substituted variable if said substituted variable is between said first and second checking values;

said second predetermined condition comprises:

(i) adjusting by one unit in a first direction said lowest weight $p_{n+1}$, if said substituted value is outside said first and second checking values thereby generating a first substituted and adjusted variable, (ii) determining if said first substituted and adjusted variable is between said first and second checking values;

(iii) retaining as a second variable said first substituted and adjusted variable if said first substituted and adjusted variable is between said first and second checking values;

(iv) adjusting by one unit in a second direction opposed to said first direction said lowest digit $p_{n+1}$, if said first substituted and adjusted variable is outside said first and second checking values thereby generating a second substituted and adjusted variable, and (v) retaining as a second variable said second substituted and adjusted variable.

34. The method as claimed in claim 31, wherein:

step (c) further comprises subtracting said current value of said second variable from said substituted variable or, as the case may be, from said substituted and adjusted variable, thereby generating a difference value; and step (d) comprises iteratively calculating said second password as many times as the value of said difference.

35. The method as claimed in claim 31 wherein step (a) comprises generating said first variable as a function of the number of authentication requests made by said at least one first unit, and wherein step (c) comprises generating said second variable as a function of the number of authentication request received by said second unit from said at least one unit.

36. The method as claimed in claim 30, wherein steps (a) and (c) comprise generating respectively said first and second variables as first and second time dependent variables.

37. The method as claimed in claim 36, wherein each of steps (a) and (c) further comprises:

supplying a basic clock signal composed of successive pulses having a predetermined frequency, counter means for counting said pulses to obtain a count, and canceling a predetermined number of the least significant digits from the count, thereby generating respectively a first intermediate time value and a second intermediate time value, whereby said first and second time dependent variables are generated respectively as functions of said first and second intermediate time values.

38. The method as claimed in claim 37, wherein each of steps (a) and (c) further comprises regulating said predetermined number of least significant digits to be canceled from the count.

39. The method as claimed in claim 37, wherein each of steps (a) and (c) further comprises:
adding a predetermined number of digits of zero value to said intermediate time values at the side of the highest weight thereof.

40. The method as claimed in claim 32, further comprising:
storing the date of initialization of each of said at least one user;
at the time an authentication request is formulated from said at least one user, comparing the time period elapsed between the date relevant for said at least one user and at least a predetermined time interval; and
increasing said range when said elapsed time interval exceeds said predetermined time interval.

41. The method as claimed in claim 33, further comprising:
storing the date of initialization of each of said at least one user;
at the time an authentication request is formulated by said at least one user, comparing the time period elapsed between the date relevant for said at least one user and at least a predetermined time interval; and
increasing said range of values when said elapsed time interval exceeds said predetermined time interval.

42. The method as claimed in claim 30, further comprising:
upon completion of each authentication request formulated by said at least one user, algebraically summing said current value of said second variable and said substituted variable or, as the case may be, said substituted and adjusted variable so as to generate an offset value;
storing said offset value as a current offset value pertaining to said at least user; and
said during at least a subsequent authentication request formulated by said at least one user calculating said substituted variable, or, as the case may be, said substituted and adjusted value, as a function of said current offset value.

43. The method as claimed in claim 42, wherein said first and second predetermined conditions are adapted as a function of said current offset value.

44. The method as claimed in claim 42, wherein said first and second variables are generated as first and second time dependent variables,
each of steps (a) and (c) further comprises:
supplying a basic clock signal composed of successive pulses having a predetermined frequency;
counting said pulses to obtain a count, said first and second time dependent variables being generated respectively as functions of count;
storing a compensating value for compensating the count in step (c) drift of the basic clock signals of steps (a) and (c) respectively; and
generating said compensating value as a function of said time offset value.

45. The method as claimed in claim 44, further comprising:
determining the time interval between a current authentication request formulated by said at least one user and a subsequent authentication request formulated by said user,
determining the difference between said time offset value calculated upon completion of said current request and said time offset value calculated upon completion of said subsequent request; and
refusing said subsequent authentication request when said difference between said time offset values exceeds a predetermined level as compared with said time interval.

46. A method for authentication of a least one user or a message from said at least one user, said method comprising:
(a) generating at least first and second variables;
(b) producing a first password as a function of at least said first and second variables;
(c) in response to an authentication request made by a specified one of said at least one user, generating at least third and fourth variables assigned to this at least one user;
(d) producing a second password as a function of at least said third and fourth variables, said first and second variables and said third and fourth variables being respectively produced in concert, but independently in steps (a) and (c);
(e) comparing said first and second passwords;
(f) in the event of a predetermined consistency of said passwords, delivering said authentication function;
said first password being transmitted with n digits having the least significant weight of said first and second variables;
step (c) comprising:
(i) based on the current value of said third and fourth variables respectively, generating first and second substituted values each wherein n digits having the least significant weight are replaced respectively by said n digits having the least significant weight of said first and second variables, said third and fourth variables thereby each comprising a replaced first group of n least significant digits and a second group of m highest significant digits;
(ii) retaining respectively as the third variable for the calculation of said second password said first substituted variable, if said first substituted variable and said current value of said third variable are consistent with at least a first predetermined condition;
(iii) if said first predetermined condition is not satisfied, adjusting in said first substituted value by one unit said second group of m highest significant digits, said adjusting being dependent from a second predetermined condition, said adjusting generating a first substituted and adjusted variable;
(iv) retaining as the third variable for the calculation of said second password said first substituted and adjusted variable;
(v) retaining as the fourth variable for the calculation of said second password said second substituted variable, if said second substituted variable and said current value of said fourth variable are consistent with at least a third predetermined condition;
(vi) if said third predetermined condition is not satisfied, adjusting in said second substituted value by one unit said second group of m highest significant digits, said adjusting being dependent from a fourth predetermined condition, said adjusting generating a second substituted and adjusted variable; and
(vii) retaining as the fourth variable for the calculation of said second password said second substituted and adjusted variable.

47. The method as claimed in claim 46, further comprising:
  said first generating means are configured so as to generating said first variable as a function of the number of authentication requests made by said at least one user;
  generating said third variable as a function of the number of authentication request received by said second unit from said at least one user; and
  generating respectively said second and fourth variables as second and fourth time dependent variables.

48. The method as claimed in claim 47, wherein said encryption keys as dynamic variable encryption keys respectively as functions of said first and third variables.

49. The method as claimed in claim 30, wherein said first encryption algorithm and said second encryption algorithm have a predetermined relationship with one another so as to produce said passwords having said predetermined consistency with one another.

50. The method as claimed in claim 46, wherein said first encryption algorithm and said second encryption algorithm have a predetermined relationship with one another so as to produce said passwords having said predetermined consistency with one another.

* * * * *